United States Patent
Murakami et al.

(10) Patent No.: US 10,358,182 B2
(45) Date of Patent: Jul. 23, 2019

(54) VEHICLE HEIGHT ADJUSTMENT DEVICE

(71) Applicant: Showa Corporation, Gyoda-shi (JP)

(72) Inventors: Yosuke Murakami, Fukuroi (JP);
Fumiaki Ishikawa, Fukuroi (JP);
Hiroyuki Miyata, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 117 days.

(21) Appl. No.: 15/074,077

(22) Filed: Mar. 18, 2016

(65) Prior Publication Data
US 2016/0288865 A1 Oct. 6, 2016

(30) Foreign Application Priority Data
Mar. 31, 2015 (JP) .................................. 2015-071525

(51) Int. Cl.
*F16F 9/46* (2006.01)
*B62K 25/04* (2006.01)
(Continued)

(52) U.S. Cl.
CPC ............ *B62K 25/04* (2013.01); *B60G 17/044* (2013.01); *B60G 17/048* (2013.01); *B62K 25/08* (2013.01);
(Continued)

(58) Field of Classification Search
CPC .......... B60G 2500/302; B60G 2500/30; B60G 2500/322; B60G 17/0272; B60G 17/027;
(Continued)

(56) References Cited

U.S. PATENT DOCUMENTS 5,080,392 A * 1/1992 Bazergui ............... B60G 15/00
188/266.4
8,844,944 B1 * 9/2014 Murakami ........... B60G 17/016
280/5.514
(Continued)

FOREIGN PATENT DOCUMENTS

DE 102013106214 A1 * 12/2014 ................ F16F 9/34
EP 1662171 A 5/2006
(Continued)

OTHER PUBLICATIONS

Extended European Search Report dated Aug. 22, 2016 for the corresponding European Patent Application No. 16161370.8.
(Continued)

*Primary Examiner* — Bradley T King
*Assistant Examiner* — Stephen M Bowes
(74) *Attorney, Agent, or Firm* — Leason Ellis LLP

(57) ABSTRACT

A vehicle height adjustment device includes a spring having one end supported on a vehicle body side and another end supported on a wheel side. An adjustor includes an accommodation chamber accommodating fluid and adjusts a length of the spring in accordance with an amount of fluid in the accommodation chamber. A storage chamber stores fluid. A guide passage guides fluid from the accommodation chamber to the storage chamber. An actuator includes an operation rod to press a push rod. A valve body closes the guide passage when seated on a seat and opens the guide passage when pressed and detached from the seat by the push rod. A press member includes a contact portion and a shaft. The press member presses and seats the valve body on the seat. An accommodation member accommodates the valve body and the contact portion. A support member supports the shaft movably.

13 Claims, 11 Drawing Sheets

(51) Int. Cl.
  *B62K 25/08* (2006.01)
  *B60G 17/044* (2006.01)
  *F16F 9/34* (2006.01)
  *F16F 1/12* (2006.01)
  *B60G 17/048* (2006.01)

(52) U.S. Cl.
  CPC ............... *F16F 1/121* (2013.01); *F16F 9/34* (2013.01); *F16F 9/461* (2013.01); *B60G 2202/413* (2013.01); *B60G 2202/414* (2013.01); *B60G 2300/12* (2013.01); *B60G 2500/302* (2013.01); *B60G 2500/322* (2013.01); *B62K 2025/044* (2013.01); *B62K 2025/045* (2013.01)

(58) Field of Classification Search
  CPC .... B60G 17/44; B60G 2300/12; B60G 15/02; B60G 15/06; B60G 15/062; F16F 1/041; F16F 1/121; F16F 9/34; F16F 9/3488; F16F 9/46; F16F 9/461; B62K 2025/044; B62K 2025/045
  See application file for complete search history.

(56) References Cited

U.S. PATENT DOCUMENTS

| | | | |
|---|---|---|---|
| 2006/0113834 A1* | 6/2006 | Hanawa | F16F 9/464 303/119.1 |
| 2006/0230758 A1 | 10/2006 | Tagata et al. | |
| 2008/0116024 A1* | 5/2008 | Heyn | F16F 9/46 188/322.13 |
| 2011/0301812 A1* | 12/2011 | Pizzagalli | B60G 17/016 701/37 |
| 2014/0001716 A1 | 1/2014 | Murakami et al. | |
| 2014/0077465 A1 | 3/2014 | Murakami et al. | |
| 2014/0124314 A1* | 5/2014 | Mochizuki | B62K 25/08 188/322.13 |
| 2014/0167371 A1 | 6/2014 | Murakami et al. | |
| 2014/0175764 A1 | 6/2014 | Murakami et al. | |
| 2016/0236533 A1* | 8/2016 | Inagaki | B60G 17/08 |

FOREIGN PATENT DOCUMENTS

| | | |
|---|---|---|
| JP | 08-22680 B | 3/1996 |
| JP | 2014-122688 A | 7/2014 |

OTHER PUBLICATIONS

U.S. Appl. No. 14/836,394, Murakami.
U.S. Appl. No. 14/850,344, Murakami.
U.S. Appl. No. 15/072,808, Murakami.
Office Action mailed Jun. 19, 2018 for the corresponding Japanese Patent Application No. 2015-071525 X.

* cited by examiner

VEHICLE HEIGHT ADJUSTMENT DEVICE

CROSS-REFERENCE TO RELATED APPLICATIONS

The present application claims priority under 35 U.S.C. § 119 to Japanese Patent Application No. 2015-071525, filed Mar. 31, 2015. The contents of this application are incorporated herein by reference in their entirety.

BACKGROUND

Field

The present invention relates to a vehicle height adjustment device.

Related Art

JPH0822680(B2) discloses a vehicle height adjustment device that increases the height of a motorcycle during travel and that decreases the height of the motorcycle during halt in order to facilitate a rider's or a passenger's getting on and off the motorcycle.

The vehicle height adjustment device automatically changes the height of the motorcycle in response to its speed of travel. Specifically, the vehicle height adjustment device automatically increases the vehicle height when the vehicle speed reaches a set speed, and automatically decreases the vehicle height when the vehicle speed becomes equal to or lower than a set speed. An electromagnetic actuator is operated to adjust the vehicle height. For example, such setting is performed that when the vehicle speed reaches the set speed, the switch is automatically turned on to operate the electromagnetic actuator. Under this setting, when the vehicle speed reaches the set speed, the vehicle height is increased. Meanwhile, such setting is performed that when the vehicle speed becomes equal to or lower than the set speed, the switch is automatically turned off. Under this setting, when the vehicle speed becomes equal to or lower than the set speed, the vehicle height is decreased.

The vehicle height adjustment device has such a configuration that the actuator (such as a solenoid) is driven to operate a valve body to make a fluid (such as oil) circulate so as to adjust the vehicle height. With this configuration, quick response of the valve body to operation of the actuator improves adjustability of the vehicle height.

SUMMARY

According to one aspect of the present invention, a vehicle height adjustment device includes a spring, an adjustor, a storage chamber, a guide passage, an actuator, a push rod, a valve body, a press member, an accommodation member, and a support member. The spring includes one end supported on a side of a body of a vehicle and includes another end supported on a side of a wheel of the vehicle. The adjustor includes an accommodation chamber that accommodates a fluid, and is configured to adjust a length of the spring in accordance with an amount of the fluid in the accommodation chamber. The storage chamber stores the fluid. The guide passage is configured to guide the fluid from the accommodation chamber to the storage chamber. The actuator includes an operation rod protruding from a case. The push rod is configured to move when pressed by the operation rod of the actuator. The valve body is configured to close the guide passage when seated on a seat and configured to open the guide passage when pressed and detached from the seat by the push rod, which has been pressed and moved by the operation rod. The press member includes a contact portion and a rod-shaped shaft. The contact portion is in contact with the valve body. The shaft is on a side of the contact portion which is opposite to the valve body side. The press member is configured to press and seat the valve body on the seat. The accommodation member accommodates the valve body and the contact portion of the press member and includes an opening on a side of the shaft of the press member. The support member is disposed in the opening of the accommodation member and configured to support the shaft of the press member movably. The support member includes a bearing hole communicating with the accommodation chamber.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 11A, 11B, and 11C schematically illustrate whether a first communication passage, a second communication passage, and a third communication passage in a front fork according to another embodiment are open or closed.

DESCRIPTION OF THE EMBODIMENTS

Figure 1:
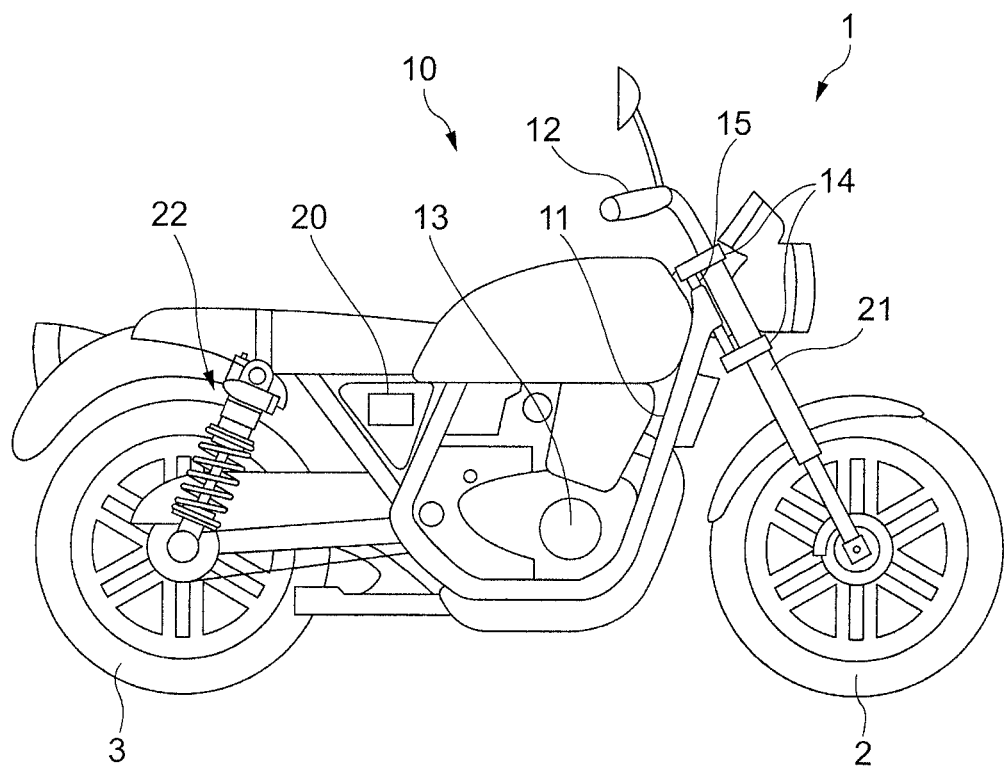
FIG. 1 illustrates a schematic configuration of a motorcycle according to an embodiment.

The embodiments will now be described with reference to the accompanying drawings, wherein like reference numerals designate corresponding or identical elements throughout the various drawings.

FIG. 1 illustrates a schematic configuration of a motorcycle 1 according to this embodiment.

The motorcycle 1 includes a front wheel 2, a rear wheel 3, and a body 10. The front wheel 2 is a wheel on the front side of the motorcycle 1. The rear wheel 3 is a wheel on the rear side of the motorcycle 1. The body 10 includes a frame 11, a handle 12, and an engine 13. The frame 11 defines the framework of the motorcycle 1.

The motorcycle 1 includes two front forks 21. One of the front forks 21 is on the right side of the front wheel 2, and the other one of the front forks 21 is on the left side of the front wheel 2. The front forks 21 are examples of a suspension device that couples the front wheel 2 and the body 10 to each other. The motorcycle 1 includes two rear suspensions 22. One of the rear suspensions 22 is on the right side of the rear wheel 3, and the other one of the rear suspensions 22 is on the left side of the rear wheel 3. The rear suspensions 22 couple the rear wheel 3 and the body 10 to each other. FIG. 1 illustrates only the front fork 21 and the rear suspension 22 that are on the right side of the motorcycle 1.

The motorcycle 1 includes two brackets 14 and a shaft 15. The shaft 15 is disposed between the two brackets 14. The two brackets 14 respectively hold the front fork 21 on the right side of the front wheel 2 and the front fork 21 on the left side of the front wheel 2. The shaft 15 is rotatably supported by the frame 11.

The motorcycle 1 includes a controller 20. The controller 20 controls the height of the motorcycle 1 by controlling a solenoid 310 in a passage switch unit 300, described later, of each front fork 21.

Each front fork 21 will be described below.

Figure 2:
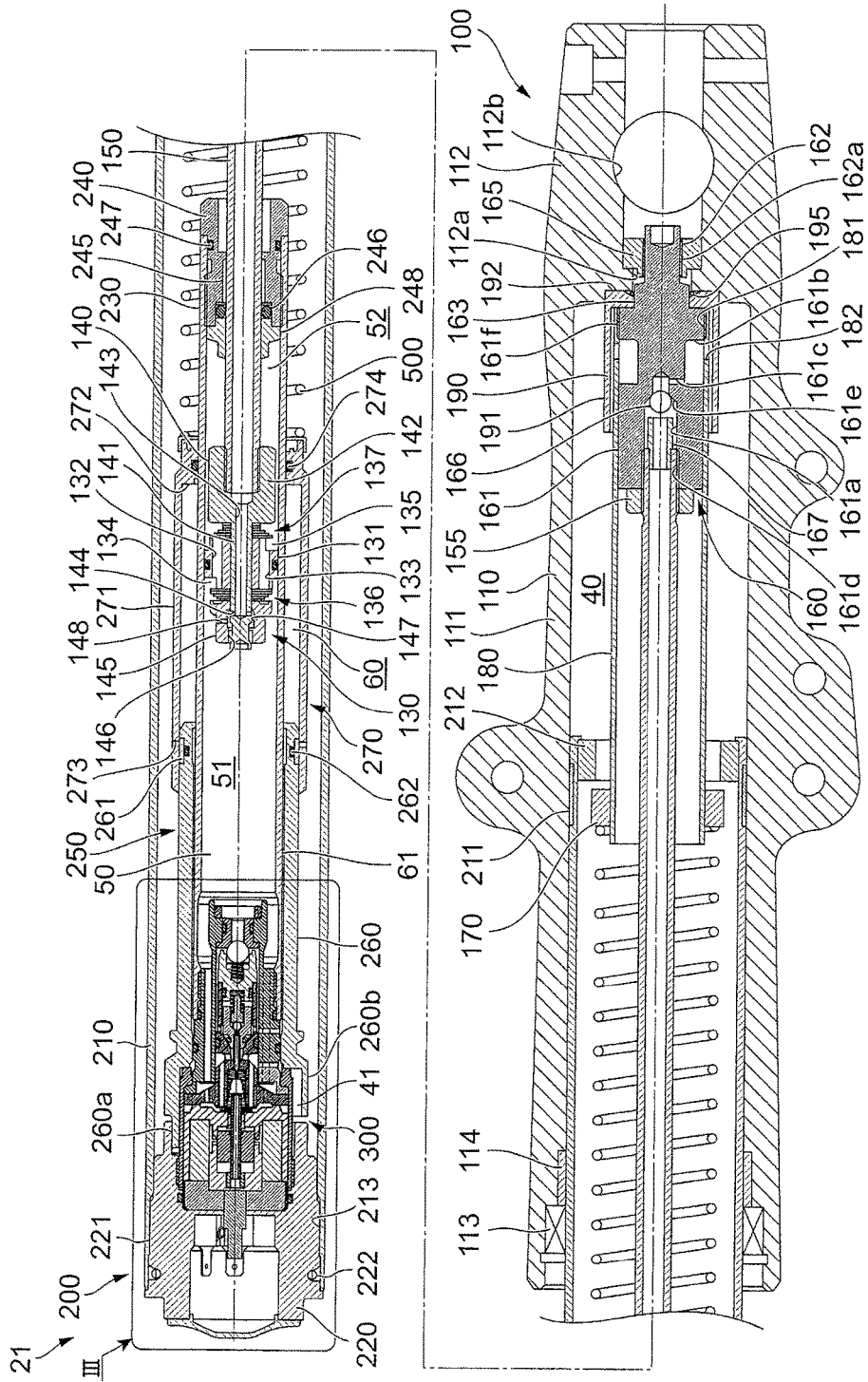
FIG. 2 is a cross-sectional view of a front fork according to the embodiment.

FIG. 2 is a cross-sectional view of the front fork 21 according to this embodiment. The front fork 21 according to this embodiment is what is called an upright front fork that is disposed between the body 10 and the front wheel 2 of the motorcycle 1 so as to support the front wheel 2. The upright front fork 21 includes an outer member 110 (detailed later) and an inner tube 210 (detailed later). The outer member 110 is disposed on the side of the front wheel 2, and the inner tube 210 is disposed on the side of the body 10.

The front fork 21 includes an axle side unit 100 and a body side unit 200. The axle side unit 100 includes the outer member 110, and is mounted on the axle of the front wheel 2. The body side unit 200 includes the inner tube 210, and is mounted on the body 10. The front fork 21 includes a spring 500. The spring 500 is disposed between the axle side unit 100 and the body side unit 200 to absorb vibrations transmitted to the front wheel 2 due to the roughness of a ground surface.

The outer member 110 and the inner tube 210 are coaxial, hollow cylindrical members. A direction of the center line (that is, an axial direction) of each cylinder will be hereinafter occasionally referred to as "vertical direction". In this case, the body 10 side will occasionally be referred to the upper side, and the front wheel 2 side will occasionally be referred to as the lower side. By moving the axle side unit 100 and the body side unit 200 relative to each other in the vertical direction (axial direction), the front fork 21 absorbs vibrations caused by the roughness of a ground surface while supporting the front wheel 2.

<Configuration of Axle Side Unit 100>

The axle side unit 100 includes the outer member 110, an attenuation force generation unit 130, a rod 150, and a rod holding member 160. The outer member 110 is mounted on the axle of the front wheel 2. The attenuation force generation unit 130 generates attenuation force utilizing viscous resistance of oil. The rod 150 holds the attenuation force generation unit 130. The rod holding member 160 holds the lower-side end of the rod 150.

The axle side unit 100 also includes a ball 166 and a regulation member 167. The ball 166 has a spherical shape and is disposed in an axial depression 161a, described later, of the rod holding member 160. The regulation member 167 regulates the movement of the ball 166.

The axle side unit 100 also includes a spring support member 170, a support-member holding member 180, and a guide member 190. The spring support member 170 supports the lower-side end of the spring 500. The support-member holding member 180 holds the spring support member 170. The guide member 190 guides the inner tube 210 to move in the axial direction.

<Configuration of Outer Member 110>

The outer member 110 includes a hollow cylindrical portion 111 and an axle bracket 112. The hollow cylindrical portion 111 has a hollow cylindrical shape for the inner tube 210 to be inserted into the hollow cylindrical shape. The axle bracket 112 is mountable to the axle of the front wheel 2.

The hollow cylindrical portion 111, at its upper end, includes an oil seal 113 and a slide bush 114. The oil seal 113 seals the gap between the outer surface of the inner tube 210 and the hollow cylindrical portion 111. The slide bush 114 smoothens the sliding contact between the hollow cylindrical portion 111 and the outer surface of the inner tube 210.

The axle bracket 112 has an axial through hole 112a and an axle mounting hole 112b. The axial through hole 112a is oriented in the axial direction for the rod holding member 160 to be inserted through the axial through hole 112a. The axle mounting hole 112b penetrates the axle bracket 112 in a direction crossing the axial direction to receive the axle of the front wheel 2.

<Configuration of Attenuation Force Generation Unit 130>

The attenuation force generation unit 130 includes a piston 131, an upper-end side valve 136, and a lower-end side valve 137. The piston 131 defines an operating oil chamber 50, which is formed in the space inside a cylinder 230, described later. The upper-end side valve 136 is disposed at the upper-side end of the piston 131. The lower-end side valve 137 is disposed at the lower-side end of the piston 131. The attenuation force generation unit 130 also includes a piston bolt 140 and a nut 145. The piston bolt 140 supports the piston 131, the upper-end side valve 136, the lower-end side valve 137, and other members. The nut 145 is screwed on the piston bolt 140 to determine the positions of the piston 131, the upper-end side valve 136, the lower-end side valve 137, and other members.

The piston 131 is a hollow cylindrical member and has on its outer surface a hermetic member sealing the gap between the cylinder 230 and the piston 131. The piston 131 also has a first through hole 132 and a second through hole 133, which are through holes open in the axial direction. The piston 131 includes first radial conduits 134 and second radial conduits 135. The first radial conduits 134 radially extend at the upper-side end of the piston 131 and communicate with the first through hole 132. The second radial conduits 135 radially extend at the lower-side end of the piston 131 and communicate with the second through hole 133. A non-limiting example of the number of each of the first through holes 132 and the second through holes 133 is three. The three first through holes 132 and the three second through holes 133 are each disposed at equal intervals in a circumferential direction and at positions respectively corresponding to the first through hole 132 and the second through hole 133.

The upper-end side valve 136 is made up of a stack of approximately disk-shaped metal plates. A through hole penetrates the center of the stack of metal plates. A shaft 141, described later, of the piston bolt 140 is inserted through the through hole. The upper-end side valve 136 blocks the second through hole 133 and opens the first through hole 132.

The lower-end side valve 137 is made up of a stack of approximately disk-shaped metal plates. A through hole penetrates the center of the stack of metal plates. The shaft 141, described later, of the piston bolt 140 is inserted through the through hole. The lower-end side valve 137 blocks the first through hole 132 and opens the second through hole 133.

The piston bolt 140 includes the shaft 141 and a base 142. The shaft 141 is disposed on the upper end side of the piston bolt 140 and has a solid cylindrical shape. The base 142 is disposed on the lower end side of the piston bolt 140 and has a solid cylindrical shape of larger radius than the radius of the shaft 141. In the piston bolt 140, a depression 143 is formed over the depth from the lower-side end surface of the base 142 to the shaft 141.

The shaft 141 has a male thread formed at the upper-side end of the shaft 141. The male thread is screwed on a female thread formed on the nut 145.

The depression 143 has a female thread formed on the inner surface at the lower-side end of the depression 143. The female thread receives a male thread formed on the upper-side end of the rod 150. At the upper-side end of the depression 143, a radial through hole 144 is formed. The radial through hole 144 radially penetrates the depression 143 to allow the depression 143 to communicate with the outside of the shaft 141.

On the upper-side end of the nut 145, a female thread 146 is formed. The female thread 146 receives a male thread of the piston bolt 140. Under the female thread 146, a depression 147 is formed. The depression 147 is depressed over a depth from the lower-side end surface of the nut 145, and has a solid cylindrical shape of larger radius than the radius of the root of the female thread 146. In the nut 145, a radial through hole 148 is formed. The radial through hole 148 radially penetrates the nut 145 to allow the outside of the nut 145 to communicate with the depression 147.

With the configuration described hereinbefore, the attenuation force generation unit 130 is held on the rod 150 with the male thread on the upper-side end of the rod 150 screwed on the female thread on the depression 143 of the piston bolt 140. The piston 131 is in contact with the inner surface of the cylinder 230 through the hermetic member on the outer surface of the piston 131. Thus, the piston 131 defines a first oil chamber 51 and a second oil chamber 52 in the space inside the cylinder 230. The first oil chamber 51 is upper than the piston 131, and the second oil chamber 52 is lower than the piston 131.

<Configuration of Rod 150>

The rod 150 is a hollow cylindrical member, and has male threads at the upper-side end and the lower-side end on the outer surface of the rod 150. The male thread on the upper-side end of the rod 150 is screwed on the piston bolt 140 of the attenuation force generation unit 130. The male thread on the lower-side end of the rod 150 is screwed on a female thread 161*d*. The female thread 161*d* is formed on an upper-end-side solid cylindrical portion 161. The upper-end-side solid cylindrical portion 161 is disposed on the upper end side of the rod holding member 160. A lock nut 155 is screwed on the male thread on the lower-side end of the rod 150. Thus, the rod 150 is secured on the rod holding member 160.

The rod 150 also has a female thread formed on the inner surface of the rod 150 at the lower-side end of the rod 150.

<Configuration of Rod Holding Member 160>

The rod holding member 160 has a plurality of solid cylindrical portions of different diameters. Namely, the rod holding member 160 includes the upper-end-side solid cylindrical portion 161, a lower-end-side solid cylindrical portion 162, and an intermediate solid cylindrical portion 163. The upper-end-side solid cylindrical portion 161 is disposed at the upper-side end of the rod holding member 160. The lower-end-side solid cylindrical portion 162 is disposed at the lower-side end of the rod holding member 160. The intermediate solid cylindrical portion 163 is disposed between the upper-end-side solid cylindrical portion 161 and the lower-end-side solid cylindrical portion 162.

The upper-end-side solid cylindrical portion 161 has the axial depression 161*a*, a radial depression 161*b*, and a radial through hole 161*c*. The axial depression 161*a* is depressed over a depth in the axial direction from the upper-side end surface of the upper-end-side solid cylindrical portion 161. The radial depression 161*b* is depressed radially throughout the circumference of the upper-end-side solid cylindrical portion 161 over a depth from the outer surface of the upper-end-side solid cylindrical portion 161. The radial through hole 161*c* penetrates the axial depression 161*a* and the radial depression 161*b* in a radial direction.

The axial depression 161*a* has the female thread 161*d*, which receives the male thread on the lower-side end of the rod 150. The axial depression 161*a* also has an inclined surface 161*e*. The inclined surface 161*e* is inclined relative to the axial direction, that is, the inner diameter of the inclined surface 161*e* gradually decreases in the lower side direction.

On the lower-side end of the upper-end-side solid cylindrical portion 161, a male thread 161*f* is formed. The male thread 161*f* is screwed on a female thread 181, which is described later and formed on the support-member holding member 180.

The intermediate solid cylindrical portion 163 has a diameter smaller than the inner diameter of the axial through hole 112*a* of the outer member 110. Thus, the intermediate solid cylindrical portion 163 is fitted in the axial through hole 112*a* of the outer member 110.

On the outer surface of the lower-end-side solid cylindrical portion 162, a male thread 162*a* is formed.

The rod holding member 160 is secured on the outer member 110 with the male thread 162*a*, which is on the lower-end-side solid cylindrical portion 162, screwed on a nut 165. The nut 165 is inserted through the axial through hole 112*a* of the outer member 110.

<Configuration of Regulation Member 167>

The regulation member 167 is a stepped, hollow cylindrical member. The regulation member 167 has a male thread formed on the outer surface at the upper-side end of the regulation member 167. The regulation member 167 is secured on the rod 150 with the male thread screwed on the female thread on the inner surface at the lower-side end of the rod 150. The regulation member 167, at its lower-side end, regulates the movement of the ball 166, which is disposed in the axial depression 161*a* of the rod holding member 160.

<Configuration of Spring Support Member 170>

The spring support member 170 is a hollow cylindrical member, and is secured on the upper-side end of the support-member holding member 180. Examples of the method of securing the spring support member 170 include, but are not limited to, welding and press fitting.

<Configuration of Support-Member Holding Member 180>

The support-member holding member 180 is a hollow cylindrical member. At the lower-side end of the support-member holding member 180, the female thread 181 is formed to receive the male thread 162a, which is formed on the rod holding member 160. The support-member holding member 180 is secured on the rod holding member 160 with the female thread 181 receiving the male thread 162a, which is formed on the rod holding member 160.

The support-member holding member 180 has a communication hole 182. The communication hole 182 is formed at a position axially corresponding to the radial depression 161b of the rod holding member 160, and thus communicates the inside and outside of the support-member holding member 180 with each other.

<Configuration of Guide Member 190>

The guide member 190 includes a hollow cylindrical portion 191 and an internally facing portion 192. The hollow cylindrical portion 191 has a hollow cylindrical shape. The internally facing portion 192 radially internally extends from the lower-side end of the hollow cylindrical portion 191.

The guide member 190 is secured between the rod holding member 160 and the outer member 110 with the internally facing portion 192 held between the rod holding member 160 and the outer member 110.

The internally facing portion 192 is chamfered at the lower-side end of the internally facing portion 192. An O ring 195 is fitted in the space defined between the chamfered portion and the rod holding member 160. The O ring 195 seals the gap between the guide member 190, the rod holding member 160, and the outer member 110. Thus, the O ring 195 keeps the space inside the hollow cylindrical portion 111 of the outer member 110 liquid tight.

In the axle side unit 100 with the configuration described hereinbefore, a reservoir chamber 40 is defined between the inner surface of the outer member 110 and the outer surfaces of the rod 150 and the support-member holding member 180. The reservoir chamber 40 stores oil kept hermetic in the front fork 21.

<Configuration of Body Side Unit 200>

The body side unit 200 includes the inner tube 210 and a cap 220. The inner tube 210 has a hollow cylindrical shape with open ends. The cap 220 is mounted on the upper-side end of the inner tube 210.

The body side unit 200 also includes the cylinder 230 and a hermetic member 240. The cylinder 230 has a hollow cylindrical shape. The hermetic member 240 is mounted on the lower-side end of the cylinder 230, and keeps the space inside the cylinder 230 hermetic.

The body side unit 200 also includes a spring length adjustment unit 250 and the passage switch unit 300. The spring length adjustment unit 250 is an example of the adjustor to support the spring 500 at its upper-side end and adjust (change) the length of the spring 500. The passage switch unit 300 is mounted on the upper-side end of the cylinder 230 and selects a passage for oil, which is an example of the fluid.

<Configuration of Inner Tube 210>

The inner tube 210 is a hollow cylindrical member.

The inner tube 210, at its lower-side end, includes a slide bush 211 and a movement regulation member 212. The slide bush 211 has a hollow cylindrical shape and smoothens the sliding contact between the inner tube 210 and the inner surface of the hollow cylindrical portion 111 of the outer member 110. The movement regulation member 212 has a hollow cylindrical shape and is in contact with the spring support member 170 and the axle bracket 112 of the outer member 110. Thus, the movement regulation member 212 regulates axial movement of the inner tube 210.

On the upper-side end of the inner tube 210, a female thread 213 is formed. The female thread 213 receives a male thread formed on the cap 220, described later.

<Configuration of Cap 220>

The cap 220 is an approximately hollow cylindrical member. On the outer surface of the cap 220, a male thread 221 is formed. The male thread 221 is screwed on the female thread 213, which is formed on the inner tube 210. On the inner surface of the cap 220, a female thread is formed that receives male threads on the spring length adjustment unit 250 and the passage switch unit 300. The cap 220 is mounted on the inner tube 210 and holds the spring length adjustment unit 250 and the passage switch unit 300.

The cap 220 includes an O ring 222. The O ring 222 keeps the space inside the inner tube 210 liquid tight.

<Configuration of Cylinder 230>

The cylinder 230 is a hollow cylindrical member. On the outer surface at the upper-side end of the cylinder 230, a female thread is formed that receives the male thread on the passage switch unit 300. On the inner surface at the lower-side end of the cylinder 230, a female thread is formed that receives a male thread on the hermetic member 240.

<Configuration of Hermetic Member 240>

The hermetic member 240 is a hollow cylindrical member. On the outer surface of the hermetic member 240, a male thread is formed that is screwed on the female thread on the inner surface at the lower-side end of the cylinder 230. The hermetic member 240 is held on the cylinder 230 with the male thread screwed on the female thread on the inner surface at the lower-side end of the cylinder 230.

The hermetic member 240 includes a slide bush 245 on the inner circumference side of the hermetic member 240. The slide bush 245 smoothens the sliding contact between the hermetic member 240 and the outer surface of the rod 150. In order to keep the space inside the cylinder 230 liquid tight, the hermetic member 240 includes an O ring 246 and an O ring 247. The O ring 246 is disposed between the hermetic member 240 and the outer surface of the rod 150. The O ring 247 is disposed between the hermetic member 240 and the inner surface of the cylinder 230.

The hermetic member 240 also includes an impact alleviation member 248 at the upper-side end of the hermetic member 240. The impact alleviation member 248 alleviates the impact of contact between the hermetic member 240 and the attenuation force generation unit 130. A non-limiting example of the impact alleviation member 248 is an elastic member such as resin and rubber.

<Configuration of Spring Length Changing Unit 250>

The spring length adjustment unit 250 includes a base member 260 and an upper-side end support member 270. The base member 260 is secured on the cap 220. The upper-side end support member 270 supports the spring 500 at its upper-side end, and is movable in the axial direction relative to the base member 260. Thus, the upper-side end support member 270 adjusts the length of the spring 500.

The base member 260 is an approximately hollow cylindrical member. On the outer surface at the upper-side end of the base member 260, a male thread 260a is formed. The male thread 260a is screwed on the female thread on the cap 220. The base member 260 is secured on the cap 220 with the male thread 260a screwed on the female thread on the cap 220.

The base member 260 has a protrusion 260b at the upper-side end of the base member 260. The protrusion 260b is a radially protruding part of the circumference of the base member 260. A discharge passage 41 is disposed between the protrusion 260b and the lower-side end on the outer surface of a support member 400, described later. The discharge passage 41 is for the oil in the cylinder 230 to be discharged into the reserver chamber 40.

The base member 260, at its lower-side end, includes a slide bush 261 and an O ring 262. The slide bush 261 has a hollow cylindrical shape fitted in the outer circumference of the base member 260, and smoothens the sliding contact between the base member 260 and the inner surface of the upper-side end support member 270. The O ring 262 is radially inner than the slide bush 261. A ring-shaped passage 61 is defined between the inner surface of the base member 260 and the outer surface of the cylinder 230. The ring-shaped passage 61 has a ring shape.

The upper-side end support member 270 includes a hollow cylindrical portion 271 and an internally facing portion 272. The hollow cylindrical portion 271 has a hollow cylindrical shape. The internally facing portion 272 radially internally extends from the lower-side end of the hollow cylindrical portion 271. The upper-side end support member 270 defines a jack chamber 60 in the space defined between the outer surface of the cylinder 230 and the lower-side end of the base member 260. The jack chamber 60 stores oil for use in adjusting the position of the upper-side end support member 270 relative to the base member 260.

The hollow cylindrical portion 271 has an inner diameter equal to or smaller than the outer diameter of the slide bush 261, which is fitted in the base member 260. The hollow cylindrical portion 271 has a radial through hole 273. The radial through hole 273 radially penetrates the hollow cylindrical portion 271 and thus communicates the inside and outside of the hollow cylindrical portion 271 with each other. Through the radial through hole 273, the oil in the jack chamber 60 is discharged into the reservoir chamber 40. In this manner, the displacement of the upper-side end support member 270 relative to the base member 260 is regulated.

The internally facing portion 272 includes an O ring 274 on the inner circumference side of the internally facing portion 272. The O ring 274 seals the gap between the internally facing portion 272 and the outer surface of the cylinder 230, and thus keeps the jack chamber 60 liquid tight.

The jack chamber 60 is supplied the oil in the cylinder 230 through the ring-shaped passage 61, which is defined between the inner surface of the base member 260 and the outer surface of the cylinder 230. This configuration will be detailed later.

<Configuration of Passage Switch Unit 300>

Figure 3:
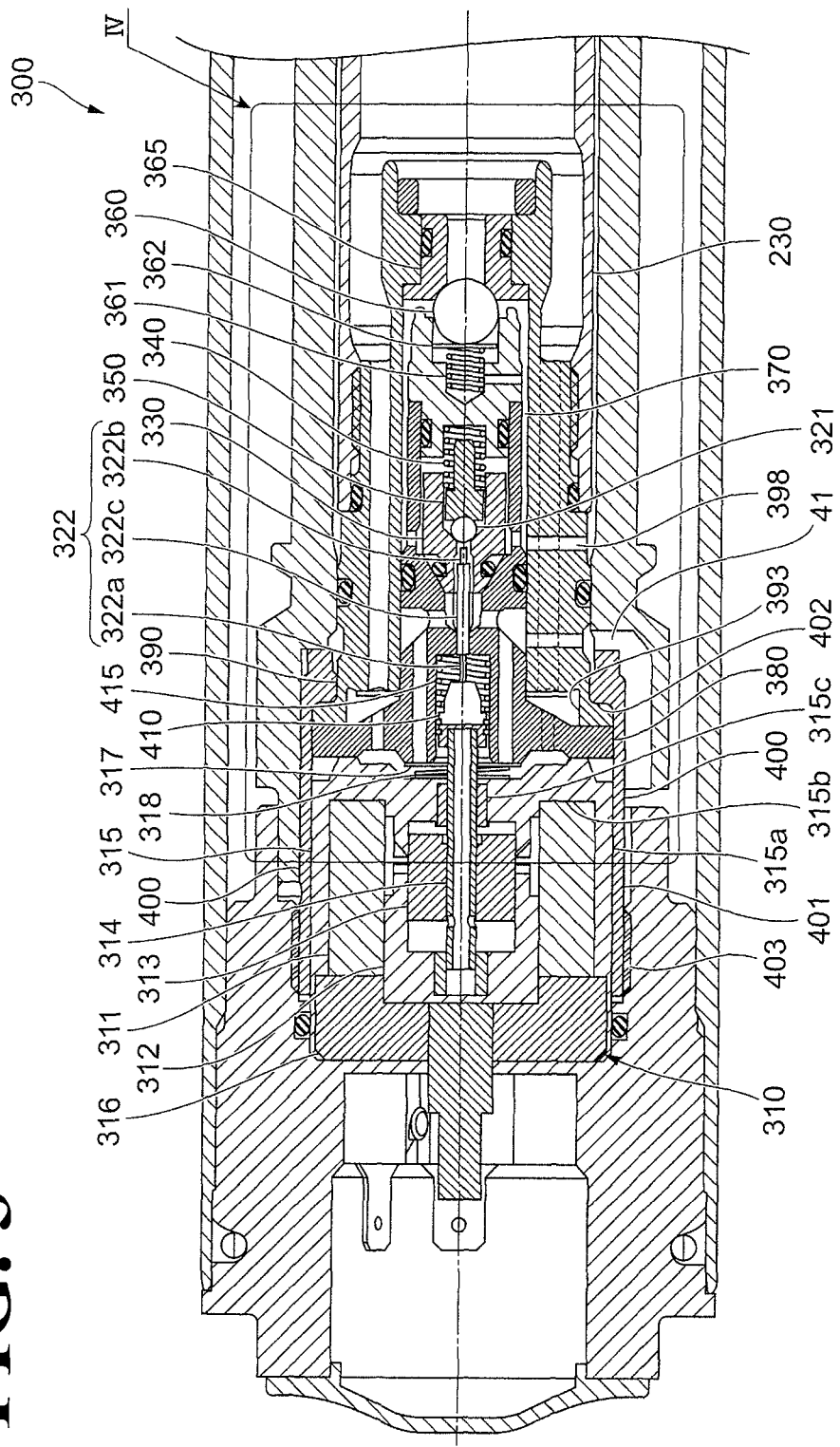
FIG. 3 is an enlarged view of part III illustrated in FIG. 2.

FIG. 3 is an enlarged view of part III in FIG. 2.

The passage switch unit 300 is a device that switches among a first option, a second option, and a third option. In the first option, the passage switch unit 300 supplies oil discharged from a pump 600, described later, to the reservoir chamber 40. In the second option, the passage switch unit 300 supplies the oil discharged from the pump 600 to the jack chamber 60. In the third option, the passage switch unit 300 supplies the oil accommodated in the jack chamber 60 to the reservoir chamber 40.

The passage switch unit 300 includes a solenoid 310, a spherical valve body 321, a push rod 322, a valve-body seat member 330, a coil spring 340, and a press member 350. The push rod 322 presses the valve body 321. The valve-body seat member 330 has a resting surface for the valve body 321. The press member 350 receives the spring force of the coil spring 340 to press the valve body 321 against the resting surface.

The passage switch unit 300 also includes a ball 360, a coil spring 361, and a disc 362. The coil spring 361 applies an axial urging force to the ball 360. The disc 362 is disposed between the ball 360 and the coil spring 361. The passage switch unit 300 also includes a ball seat member 365 and an accommodation member 370. The ball seat member 365 has a resting surface for the ball 360. The accommodation member 370 accommodates the coil spring 361 and the disc 362.

The passage switch unit 300 also includes a valve accommodation inner member 380, a valve accommodation outer member 390, and the support member 400. The valve accommodation inner member 380 accommodates the valve body 321, the valve-body seat member 330, and other members. The valve accommodation outer member 390 is disposed outside the valve accommodation inner member 380, and accommodates the ball 360, the ball seat member 365, and other members. The support member 400 supports the valve accommodation inner member 380 and the valve accommodation outer member 390.

The passage switch unit 300 also includes a transmission member 410 and a coil spring 415. The transmission member 410 is mounted on the lower end of an operation rod 314, described later, of the solenoid 310, and transmits thrust of the solenoid 310 to the push rod 322. The coil spring 415 applies an axial urging force to the transmission member 410.

<Configuration of Solenoid 310>

The solenoid 310 is a proportional solenoid that includes a coil 311, a core 312, a plunger 313, and an operation rod 314. The core 312 is disposed inside the coil 311. The plunger 313 is guided by the core 312. The operation rod 314 is coupled to the plunger 313.

The solenoid 310 also includes a case 315 and a cover 316. The case 315 accommodates the coil 311, the core 312, the plunger 313, and other members. The cover 316 covers an opening of the case 315.

The case 315 includes a hollow cylindrical portion 315a and an internally facing portion 315b. The hollow cylindrical portion 315a has a hollow cylindrical shape. The internally facing portion 315b radially internally extends from the lower-side end of the hollow cylindrical portion 315a. The internally facing portion 315b has a through hole through which the operation rod 314 is inserted. A guide bush 315c is fitted with the internally facing portion 315b to guide the movement of the operation rod 314.

The operation rod 314 has a hollow cylindrical shape. At the upper-side end, the operation rod 314 is accommodated in the case 315. At the lower-side end, the operation rod 314 protrudes from the case 315. The portion of the operation rod 314 protruding from the case 315 is attached with a disc-shaped valve 317. The disc-shaped valve 317 opens and closes a passage, described later, formed in the valve accommodation inner member 380. A coil spring 318 surrounds the portion of the operation rod 314 between the valve 317 and the case 315. The coil spring 318 applies an axial urging force to the valve 317.

With the configuration of the solenoid 310 described hereinbefore, the coil 311 is supplied a current through a connector and a lead that are mounted on the cap 220. The current causes the plunger 313 to generate an axial thrust in accordance with the amount of the current. The thrust of the plunger 313 causes the operation rod 314, which is coupled to the plunger 313, to make an axial movement. In the solenoid 310 according to this embodiment, the plunger 313 generates an amount of axial thrust that causes the operation rod 314 to protrude from the case 315 by an amount that increases as the current supplied to the coil 31 increases.

The amount of the current supplied to the coil 311 is controlled by the controller 20.

Figure 4:
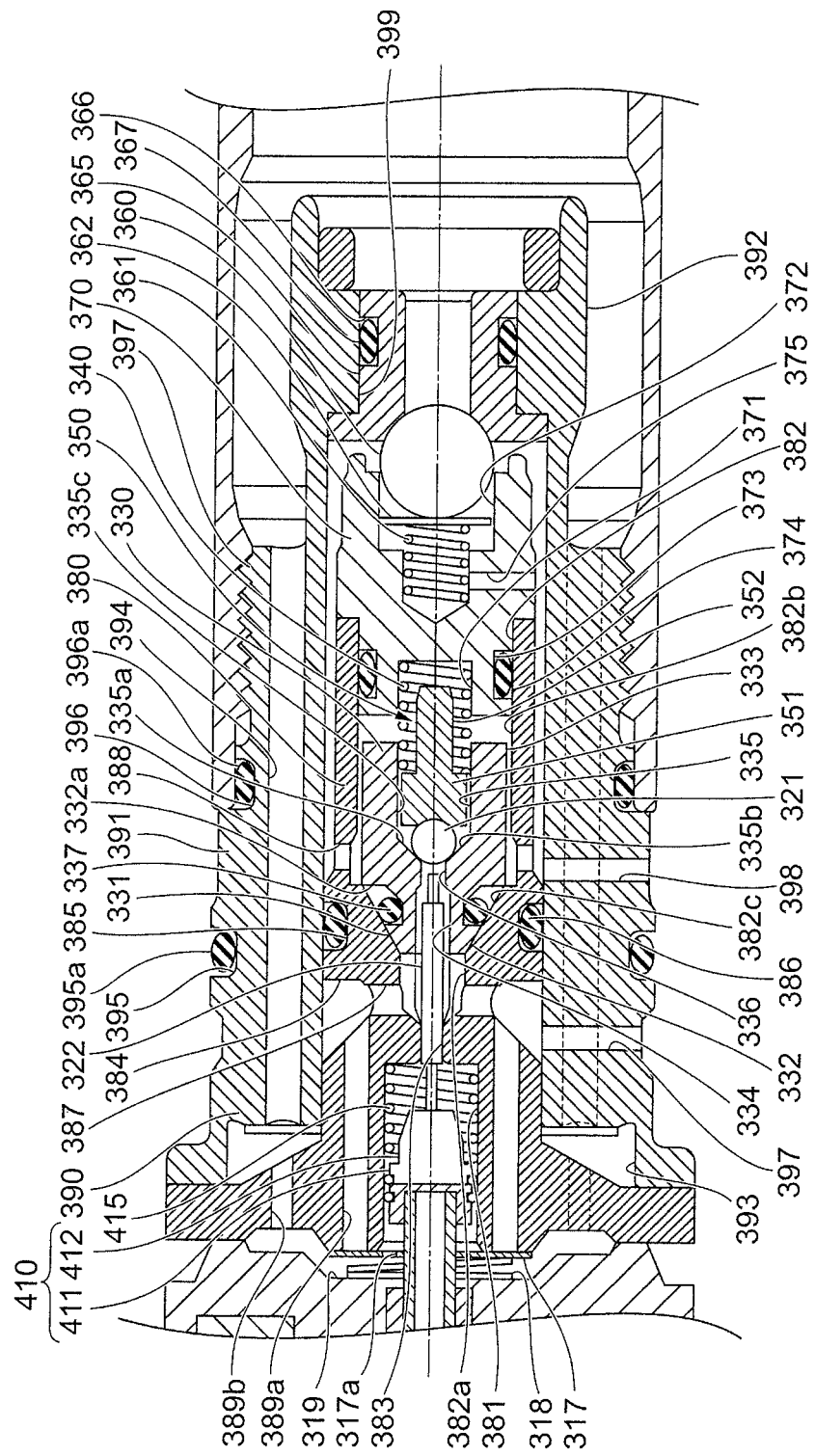
FIG. 4 is an enlarged view of part IV illustrated in FIG. 3.

FIG. 4 is an enlarged view of part IV in FIG. 3.

<Configuration of Push Rod 322>

The push rod 322 includes a first shaft 322a, a second shaft 322b, and a third shaft 322c. The first shaft 322a has a solid cylindrical shape and is disposed on the upper end side of the push rod 322. The second shaft 322b has a solid cylindrical shape and is disposed on the lower end side of the push rod 322. The third shaft 322c has a solid cylindrical shape and is disposed between the first shaft 322a and the second shaft 322b.

The third shaft 322c has a radius larger than each radius of the first shaft 322a and the second shaft 322b. In other words, a cross-sectional area Sp of the third shaft 322c perpendicular to the axial direction is larger than a cross-sectional area of each of the first shaft 322a and the second shaft 322b perpendicular to the axial direction.

The valve body 321 and the push rod 322 may be integral to each other.

<Configuration of Valve-Body Seat Member 330>

The valve-body seat member 330 includes a conical portion 332 and a solid cylindrical portion 333. The conical portion 332 has an inclined surface 331. The inclined surface 331 is inclined relative to the axial direction, that is, the outer diameter of the valve-body seat member 330 gradually increases in the lower side direction. The solid cylindrical portion 333 has a solid cylindrical shape.

The conical portion 332 has an upper-end depression 334. The upper-end depression 334 is depressed over a depth in the axial direction from the upper-side end surface of the conical portion 332. The solid cylindrical portion 333 has a lower-end depression 335 and a communication hole 336. The lower-end depression 335 is depressed over a depth in the axial direction from the lower-side end surface of the solid cylindrical portion 333. Through the communication hole 336, the lower-end depression 335 and the upper-end depression 334 communicate with each other.

The upper-end depression 334 has an inner diameter larger than the radius of the third shaft 322c. The communication hole 336 has an inner diameter larger than the radius of the second shaft 322b. The second shaft 322b and the third shaft 322c in the push rod 322 are inserted in the communication hole 336 and the upper-end depression 334. The gap between the outer surface of the second shaft 322b and the inner surface of the communication hole 336, and the gap between the outer surface of the third shaft 322c and the inner surface of the upper-end depression 334 function as part of a third communicating passage R3, described later, and part of a fourth communicating passage R4, described later.

The lower-end depression 335 includes a conical depression 335b and a cylindrical depression 335c. The conical depression 335b has an inclined surface 335a. The inclined surface 335a is inclined relative to the axial direction, that is, the radius of the conical depression 335b gradually increases in the lower side direction. The cylindrical depression 335c has a cylindrical shape. The radius of the conical depression 335b increases in the lower side direction from a value smaller than the radius of the valve body 321 to a value larger than the radius of the valve body 321. The conical depression 335b accommodates the valve body 321. With the valve body 321 in contact with the inclined surface 335a, the gap between the valve body 321 and the conical depression 335b is sealed. The radius of the cylindrical depression 335c of the lower-end depression 335 is larger than the radius of a first solid cylindrical portion 351, described later, of the press member 350. The lower-end depression 335 accommodates the first solid cylindrical portion 351 of the press member 350.

The conical portion 332 has a groove 332a on the outer surface of the conical portion 332. The groove 332a is depressed radially throughout the circumference of the conical portion 332. An O ring 337 is fitted in the groove 332a to seal the gap between the conical portion 332 and the valve accommodation inner member 380.

<Configuration of Press Member 350>

The press member 350 includes two solid cylindrical portions of different diameters, namely, the first solid cylindrical portion 351 and the second solid cylindrical portion 352. The first solid cylindrical portion 351 has a depression formed on the upper-side end surface of the first solid cylindrical portion 351. This depression fits the shape of the lower-side end of the valve body 321. The radius of the first solid cylindrical portion 351 is larger than the radius of the valve body 321 and larger than half the center diameter of the coil spring 340. On the upper-side end surface, the first solid cylindrical portion 351 supports the lower-side end of the valve body 321. On the lower-side end surface, the first solid cylindrical portion 351 supports the upper-side end of the coil spring 340.

The radius of the second solid cylindrical portion 352 is smaller than half the inner diameter of the coil spring 340. The second solid cylindrical portion 352 is inside the coil spring 340.

<Configuration of Ball Seat Member 365>

The ball seat member 365 is a hollow cylindrical member with a flange formed at the upper-side end of the ball seat member 365. The ball seat member 365 has an opening at the upper-side end of the ball seat member 365. In the opening, a depression is formed that fits the shape of the lower-side end of the ball 360. The ball seat member 365 has a groove 366 formed on the outer surface of the ball seat member 365. The groove 366 is depressed radially throughout the circumference of the ball seat member 365. An O ring 367 is fitted in the groove 366 to seal the gap between the groove 366 and the valve accommodation outer member 390.

<Configuration of Accommodation Member 370>

The accommodation member 370 is an approximately solid cylindrical member. The accommodation member 370 has an upper-end depression 371 and a lower-end depression 372. The upper-end depression 371 has a cylindrical shape and is depressed over a depth in the axial direction from the upper-side end surface of the accommodation member 370. The lower-end depression 372 has a cylindrical shape and is depressed over a depth in the axial direction from the lower-side end surface of the accommodation member 370. The upper-end depression 371 accommodates the lower-side end of the coil spring 340. The lower-end depression 372 accommodates the coil spring 361 and the disc 362. The opening of the lower-end depression 372 is larger in size than the upper-side end of the ball 360. The lower-end depression 372 accommodates the upper-side end of the ball 360.

The accommodation member 370 is fitted in the lower-side end of the valve accommodation inner member 380. On the outer surface of the accommodation member 370, a groove 373 is formed. The groove 373 is depressed radially throughout the circumference of the accommodation member 370. An O ring 374 is fitted in the groove 373 to seal the gap between the accommodation member 370 and the valve accommodation inner member 380.

A radial through hole 375 is formed in a portion of the accommodation member 370 exposed from the valve accommodation inner member 380. The radial through hole 375 radially penetrates the accommodation member 370 to allow the inside of the lower-end depression 372 to communicate with the outside of the accommodation member 370.

<Configuration of Valve Accommodation Inner Member 380>

The valve accommodation inner member 380 is an approximately solid cylindrical member with a flange formed at the upper-side end of the valve accommodation inner member 380. The valve accommodation inner member 380 has an upper-end depression 381, a lower-end depression 382, and a communication hole 383. The upper-end depression 381 is depressed over a depth in the axial direction from the upper-side end surface of the valve accommodation inner member 380. The lower-end depression 382 is depressed over a depth in the axial direction from the lower-side end surface of the valve accommodation inner member 380. Through the communication hole 383, the upper-end depression 381 and the lower-end depression 382 communicate with each other.

On the outer surface of the valve accommodation inner member 380, a first radial depression 384 and a second radial depression 385 are formed. The first radial depression 384 and the second radial depression 385 are depressed radially throughout the circumference of the valve accommodation inner member 380.

The upper-end depression 381 has a solid cylindrical shape that accommodates the transmission member 410 and the coil spring 415.

The lower-end depression 382 includes a first cylindrical depression 382a, a second cylindrical depression 382b, and a conical depression 382c. The first cylindrical depression 382a and the second cylindrical depression 382b have cylindrical shapes of different diameters. The conical depression 382c is formed between the first cylindrical depression 382a and the second cylindrical depression 382b, and has an inclined surface inclined relative to the axial direction, that is, the radius of the conical depression 382c gradually increases in the lower side direction.

The first cylindrical depression 382a, the second cylindrical depression 382b, and the second cylindrical depression 382b accommodate the valve-body seat member 330. Specifically, the inclined surface of the conical depression 382c fits the shape of the inclined surface 331 of the conical portion 332 of the valve-body seat member 330. The second cylindrical depression 382b has a radius smaller than the radius of the solid cylindrical portion 333 of the valve-body seat member 330.

The upper-side end of the accommodation member 370 is fitted in the opening of the lower-end depression 382, that is, the lower-side end of the second cylindrical depression 382b. The O ring 374, which is fitted in the accommodation member 370, seals the gap between the accommodation member 370 and the valve accommodation inner member 380.

An O ring 386 is fitted in the second radial depression 385 to seal the gap between the second radial depression 385 and the valve accommodation outer member 390.

The valve accommodation inner member 380 has a plurality of first radial communication holes 387, which are formed at equal intervals in the circumferential direction. Each first radial communication hole 387 is a radial through hole through which the first cylindrical depression 382a of the lower-end depression 382 and the first radial depression 384 communicate with each other.

The valve accommodation inner member 380 has a plurality of second radial communication holes 388, which are formed at equal intervals in the circumferential direction. Each second radial communication hole 388 is a radial through hole through which the second cylindrical depression 382b and the outside of the valve accommodation inner member 380 communicate with each other.

The valve accommodation inner member 380 has a plurality of inner axial communication holes 389a formed at equal intervals in the circumferential direction. Each inner axial communication hole 389a is an axial through hole through which the upper-side end of the valve accommodation inner member 380 and the first radial depression 384 communicate with each other.

The valve accommodation inner member 380 has a plurality of outer axial communication holes 389b formed at equal intervals in the circumferential direction. The outer axial communication holes 389b axially penetrate the flange.

<Configuration of Valve Accommodation Outer Member 390>

The valve accommodation outer member 390 includes a first hollow cylindrical portion 391, a second hollow cylindrical portion 392, and a flange. The first hollow cylindrical portion 391 and the second hollow cylindrical portion 392 have cylindrical shapes of different diameters. The flange extends radially outwardly from the upper-side end of the first hollow cylindrical portion 391. The first hollow cylindrical portion 391 has an outer diameter larger than the outer diameter of the second hollow cylindrical portion 392.

The valve accommodation outer member 390 has an upper-end depression 393. The upper-end depression 393 is depressed over a depth in the axial direction from the upper-side end surface of the valve accommodation outer member 390.

The first hollow cylindrical portion 391 has a plurality of axial communication holes 394, which are formed at equal intervals in the circumferential direction. Each axial communication hole 394 allows the upper-end depression 393 to communicate with the space that is below the first hollow cylindrical portion 391 and defined between the outer surface of the second hollow cylindrical portion 392 and the inner surface of the cylinder 230.

The first hollow cylindrical portion 391 has, on its outer surface, a first radial depression 395, a second radial depression 396, and a male thread 397. The first radial depression 395 and the second radial depression 396 are depressed radially throughout the circumference of the first hollow cylindrical portion 391. The male thread 397 is screwed on the female thread at the upper-side end of the cylinder 230.

An O ring 395a is fitted in the first radial depression 395 to seal the gap between the first radial depression 395 and the base member 260 of the spring length adjustment unit 250.

An O ring 396a is fitted in the second radial depression 396 to seal the gap between the second radial depression 396 and the cylinder 230.

The first hollow cylindrical portion 391 has a plurality of first radial communication holes 397 and a plurality of second radial communication holes 398. The first radial communication holes 397 and the second radial communication holes 398 are radial through holes that allow the inside and outside of the first hollow cylindrical portion 391 to communicate with each other. The first radial communication holes 397 and the second radial communication holes 398 are formed at equal intervals in the circumferential direction and at positions on the first hollow cylindrical portion 391 where no axial communication holes 394 are formed. Specifically, the first radial communication holes 397 are at positions upper in the axial direction than the positions of the first radial depression 395, and the second radial communication holes 398 are formed between the first radial depression 395 and the second radial depression 396 in the axial direction.

The second hollow cylindrical portion 392 has a protrusion 399. The protrusion 399 radially internally protrudes from the inner surface of the second hollow cylindrical portion 392. The flange of the ball seat member 365 is mounted on the upper-side end surface of the protrusion 399. The gap between the inner surface of the protrusion 399 and the outer surface of the ball seat member 365 is sealed by the O ring 367, which is fitted in the ball seat member 365.

The cylinder 230 is held on the valve accommodation outer member 390 with the male thread 397 on the outer surface of the first hollow cylindrical portion 391 screwed on the female thread on the inner surface of the cylinder 230.

<Configuration of Support Member 400>

As illustrated in FIG. 3, the support member 400 includes a hollow cylindrical portion 401 and an internally facing portion 402. The hollow cylindrical portion 401 has a hollow cylindrical shape. The internally facing portion 402 radially internally extends from the lower-side end of the hollow cylindrical portion 401.

On the outer surface at the upper-side end of the hollow cylindrical portion 401, a male thread 403 is formed. The male thread 403 is screwed on the female thread on the cap 220. The support member 400 is held on the cap 220 with the male thread 403, which is formed on the outer surface of the hollow cylindrical portion 401, screwed on the female thread on the cap 220. The support member 400 holds the valve accommodation inner member 380 and the valve accommodation outer member 390 by holding the flange of the valve accommodation inner member 380 and the flange of the valve accommodation outer member 390 between the internally facing portion 402 and the solenoid 310.

<Configuration of Transmission Member 410>

The transmission member 410 includes a first solid cylindrical portion 411 and a second solid cylindrical portion 412. The first solid cylindrical portion 411 and the second solid cylindrical portion 412 have solid cylindrical shapes of different diameters.

The second solid cylindrical portion 412 has an outer diameter smaller the inner diameter of the coil spring 415, and thus the second solid cylindrical portion 412 is inserted in the coil spring 415.

The first solid cylindrical portion 411 has an outer diameter larger than the inner diameter of the coil spring 415. The first solid cylindrical portion 411 has a groove formed on the outer surface of the first solid cylindrical portion 411. The upper-side end of the coil spring 415 is fitted in the groove.

The transmission member 410 and the coil spring 415 are accommodated in the upper-end depression 381 of the valve accommodation inner member 380.

The valve 317 and the coil spring 318 are accommodated in a depression 319, which is formed on the lower-side end surface of the solenoid 310. The valve 317 has an axial through hole 317a. The axial through hole 317a is formed at a position facing the upper-end depression 381 of the valve accommodation inner member 380. The coil spring 318 applies, to the valve 317, an axial urging force directed toward the upper-side end surface of the valve accommodation inner member 380.

With the configuration of the passage switch unit 300 described hereinbefore, when supply of current to the coil 311 of the solenoid 310 is stopped or when the current supplied to the coil 311 is less than a predetermined first reference current, the protrusion amount of the operation rod 314, which protrudes from the case 315, becomes less than a predetermined first reference amount. When the protrusion amount of the operation rod 314 is less than the first reference amount, the valve 317, which is mounted on the operation rod 314, does not rest on the upper-side end surface of the valve accommodation inner member 380. This releases open the opening on the upper end side of the inner axial communication hole 389a, which is formed in the valve accommodation inner member 380.

When the current supplied to the coil 311 of the solenoid 310 is equal to or higher than the first reference current, the operation rod 314 moves in the lower side direction to protrude by an amount that is equal to or larger than the first reference amount. When the amount of protrusion of the operation rod 314 is equal to or larger than the first reference amount, the valve 317, which is mounted on the operation rod 314, rests on the upper-side end surface of the valve accommodation inner member 380 to close the opening on the upper end side of the inner axial communication hole 389a. In other words, when the operation rod 314 protrudes from the case 315 by an amount that is equal to or larger than the first reference amount, the valve 317 protrudes to a position at which the valve 317 rests on the upper-side end surface of the valve accommodation inner member 380.

When the current supplied to the coil 311 of the solenoid 310 is equal to or higher than a predetermined second reference current, which is higher than the first reference current, the operation rod 314 moves further in the lower side direction to protrude from the case 315 by an amount that is equal to or larger than second reference amount, which is larger than the first reference amount. When the amount of protrusion of the operation rod 314 is equal to or higher than the second reference amount, the operation rod 314 pushes in the lower side direction the push rod 322 through the transmission member 410. When the push rod 322 is pushed in the lower side direction, the valve body 321 is pushed by the push rod 322 away from the inclined surface 335a of the lower-end depression 335 of the valve-body seat member 330. In other words, when the operation rod 314 protrudes from the case 315 by an amount that is equal to or higher than the second reference amount, the push rod 322 is pushed by the operation rod 314 to push the valve body 321 away from the inclined surface 335a, which is an example of the resting surface.

When the supply of current to the coil 311 is stopped or when the current supplied to the coil 311 is less than the first reference current, the valve 317, which is mounted on the operation rod 314, releases the inner axial communication hole 389a, which is formed in the valve accommodation inner member 380, and the valve body 321 rests on the inclined surface 335a of the lower-end depression 335 of the valve-body seat member 330. This state will be hereinafter referred to as first switch state.

When the current supplied to the coil 311 is equal to or higher than the first reference current and less than the second reference current, the valve 317, which is mounted on the operation rod 314, closes the inner axial communication hole 389a, which is formed in the valve accommodation inner member 380, and the valve body 321 rests on the inclined surface 335a of the lower-end depression 335 of the valve-body seat member 330. This state will be hereinafter referred to as second switch state.

When the current supplied to the coil 311 is equal to or higher than the second reference current and less than a third reference current, the valve 317, which is mounted on the operation rod 314, closes the inner axial communication hole 389a, which is formed in the valve accommodation inner member 380, and the valve body 321 is away from the inclined surface 335a of the lower-end depression 335 of the valve-body seat member 330. This state will be hereinafter referred to as third switch state.

When the current supplied to the coil 311 is equal to or higher than the third reference current, the valve 317, which is mounted on the operation rod 314, closes the inner axial communication hole 389a, which is formed in the valve accommodation inner member 380, and the inclined surface 331 of the conical portion 332 of the valve-body seat member 330 is away from the inclined surface on the conical depression 382c of the valve accommodation inner member 380. This state will be hereinafter referred to as fourth switch state. In the fourth switch state, the valve body 321 rests on the inclined surface 335a of the lower-end depression 335 of the valve-body seat member 330.

Operation of Front Fork 21

With the configuration of the front fork 21 described hereinbefore, the spring 500 supports the weight of the motorcycle 1 and thus absorbs impact. The attenuation force generation unit 130 attenuates the vibration in the spring 500.

Figure 5:
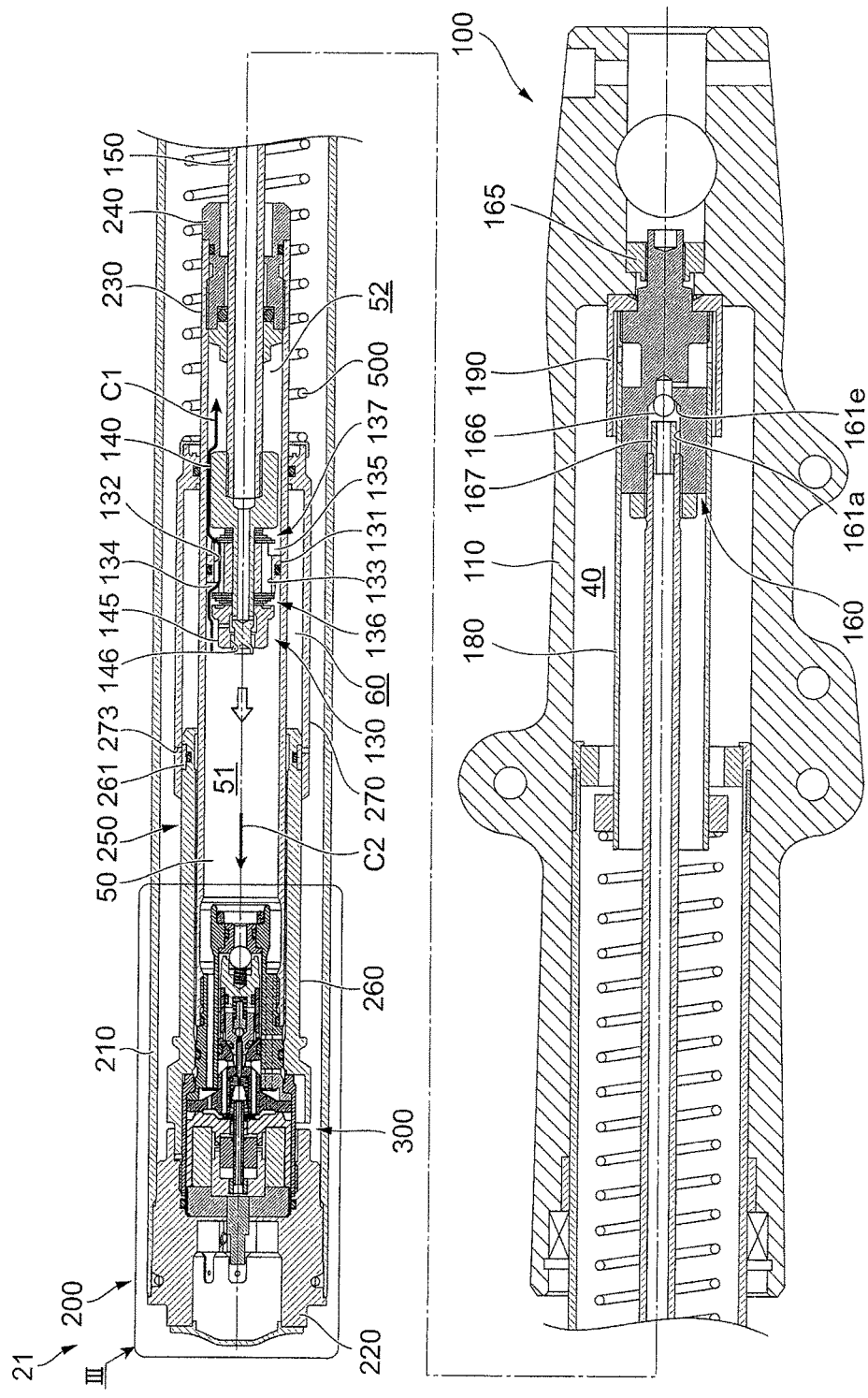
FIG. 5 illustrates how the front fork operates at the time of a compression stroke.

FIG. 5 illustrates how the front fork 21 operates at the time of a compression stroke.

In the compression stroke of the front fork 21, the piston 131 of the attenuation force generation unit 130 moves in the upper-side direction relative to the cylinder 230 as indicated by the outlined arrow. The movement of the piston 131 causes the oil in the first oil chamber 51 to be pressurized. This causes the lower-end side valve 137 covering the first through hole 132 to open and the oil to flow into the second oil chamber 52 through the first through hole 132 (see arrow C1). The oil flow from the first oil chamber 51 to the second oil chamber 52 is narrowed through the first through hole 132 and the lower-end side valve 137. This causes attenuation force for the compression stroke to be generated.

At the time of the compression stroke, the rod 150 enters the cylinder 230. The entry causes an amount of oil corresponding to the volume of the rod 150 in the cylinder 230 to be supplied to the jack chamber 60 or the reservoir chamber 40, which depends on the switch state selected by the passage switch unit 300 (see arrow C2). The switch state selected by the passage switch unit 300 as to which of the jack chamber 60 and the reservoir chamber 40 to supply the oil will be described later. Here, the attenuation force generation unit 130, the rod 150, the cylinder 230, and other elements function as a pump to supply the oil in the cylinder 230 to the jack chamber 60 or the reservoir chamber 40. In the following description, this pump will occasionally be referred to as "pump 600".

Figure 6:
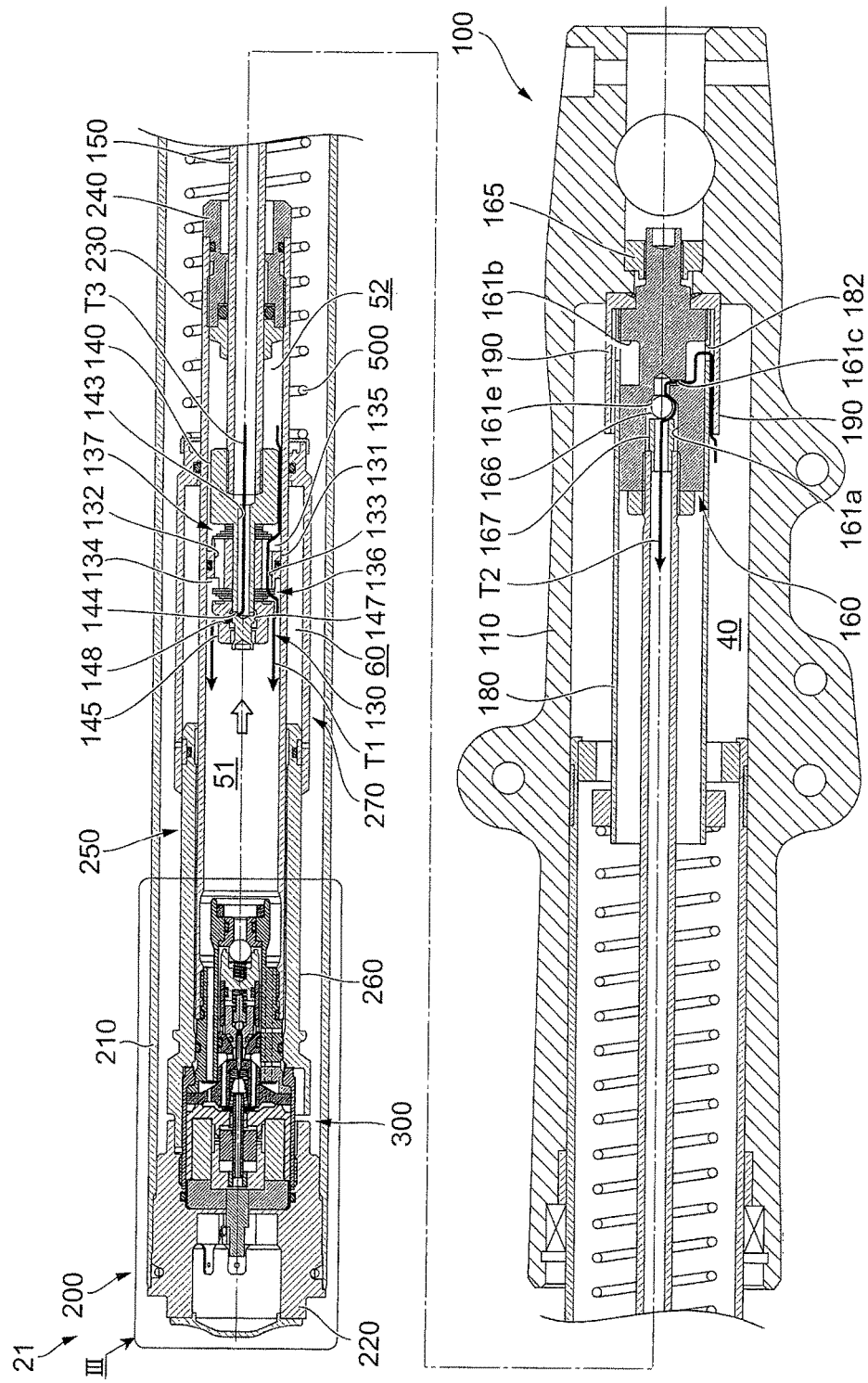
FIG. 6 illustrates how the front fork operates at the time of a rebound stroke.

FIG. 6 illustrates how the front fork 21 operates at the time of a rebound stroke. In the rebound stroke of the front fork 21, the piston 131 of the attenuation force generation unit 130 moves in the lower-side direction relative to the cylinder 230 as indicated by the outlined arrow. The movement of the piston 131 causes the oil in the second oil chamber 52 to be pressurized. This causes the upper-end side valve 136 covering the second through hole 133 to open and the oil to flow into the first oil chamber 51 through the second through hole 133 (see arrow T1). The oil flow from the second oil chamber 52 to the first oil chamber 51 is narrowed through the first through hole 132 and the upper-end side valve 136. This causes attenuation force for the rebound stroke to be generated.

At the time of the rebound stroke, the rod 150 withdraws from the cylinder 230. The withdrawal causes an amount of oil corresponding to the volume of the rod 150 that has been in the cylinder 230 to be supplied from the reservoir chamber 40 to the first oil chamber 51. That is, the movement of the piston 131 in the lower-side direction causes the first oil chamber 51 to be depressurized and the oil in the reservoir chamber 40 to enter the first oil chamber 51. Specifically, the oil in the reservoir chamber 40 passes through the communication hole 182 of the support-member holding member 180 and the radial through hole 161c of the rod holding member 160, and enters the axial depression 161a of the rod holding member 160. Then, the oil moves the ball 166 in the upper-side direction and enters the rod 150 (see arrow T2). In the rod 150, the oil passes through the depression 143 of the piston bolt 140, the radial through hole 144, and the radial through hole 148 of the nut 145, and reaches the first oil chamber 51 (see arrow T3).

Thus, the communication hole 182 of the support-member holding member 180, the radial through hole 161c of the rod holding member 160, the axial depression 161a of the rod holding member 160, the inside of the rod 150, the depression 143 of the piston bolt 140, the radial through hole 144, the radial through hole 148 of the nut 145 function as intake passages through which oil is taken from the reservoir chamber 40 into the cylinder 230 (first oil chamber 51). The ball 166 and the inclined surface 161e, which is formed on the axial depression 161a of the rod holding member 160, function as a check valve that allows oil to flow from the reservoir chamber 40 into the inside of the rod 150 and that restricts discharge of the oil from the inside of the rod 150 to the reservoir chamber 40. The ball 166 and the inclined surface 161e will be referred to as "intake-side check valve Vc".

Flow of Oil in Accordance with Switch State Selected by Passage Switch Unit 300

Figure 7:
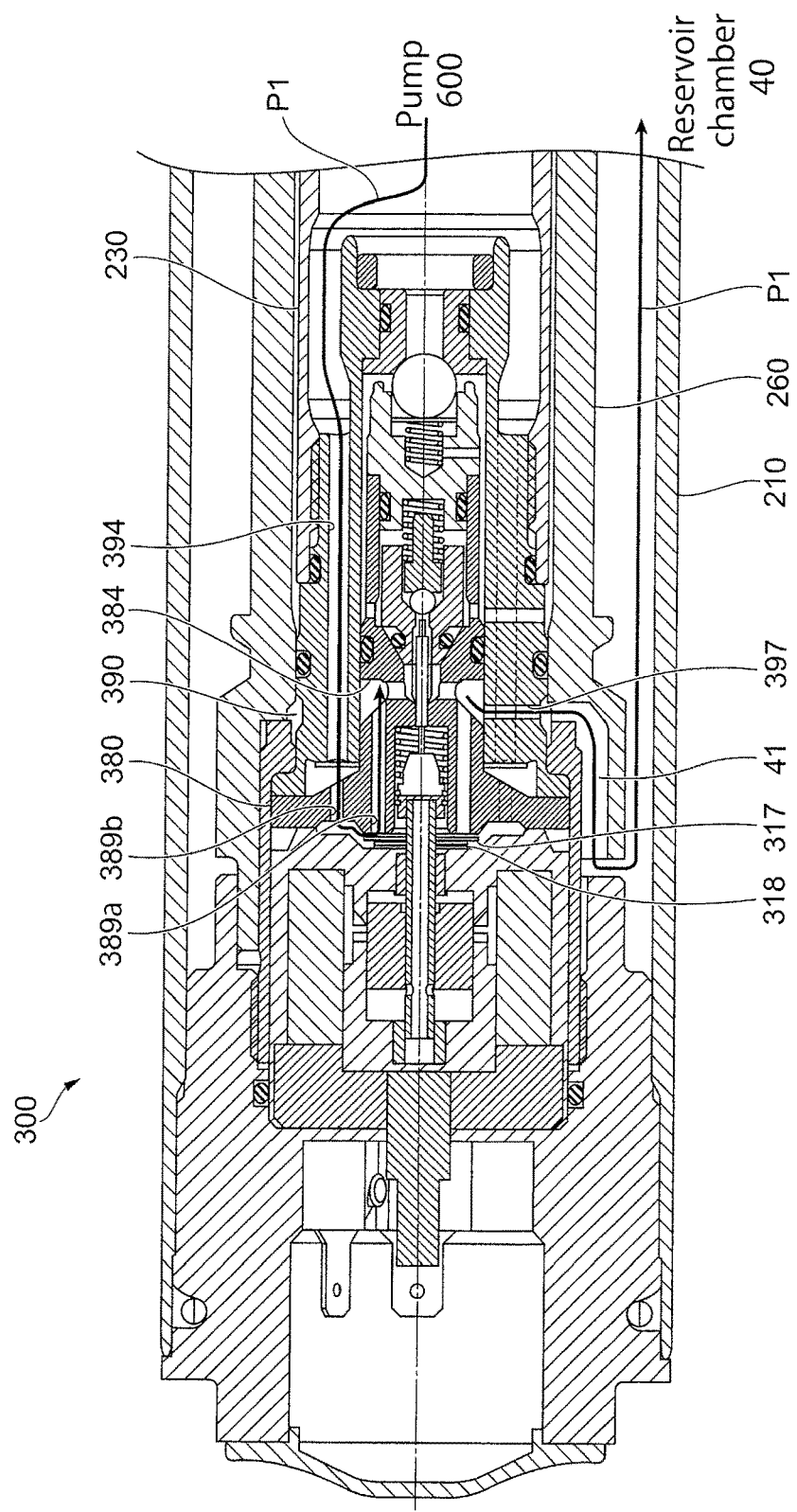
FIG. 7 illustrates a flow of oil in a passage switch unit in a first switch state.

FIG. 7 illustrates a flow of oil in the passage switch unit 300 in the first switch state.

When the passage switch unit 300 is in the first switch state at the time of the compression stroke of the front fork 21, oil discharged from the pump 600, which is made up of members such as the attenuation force generation unit 130, the rod 150, and the cylinder 230, flows in the upper side direction through the axial communication holes 394, which are formed in the valve accommodation outer member 390 as indicated by arrow P1 in FIG. 7. The oil that has flown in the upper side direction through the axial communication holes 394, which are formed in the valve accommodation outer member 390, flows in the upper side direction through the outer axial communication hole 389b of the valve accommodation inner member 380, and then flows in the lower side direction through the inner axial communication hole 389a, which is open. Then, the oil flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the axial communication holes 394 of the valve accommodation outer member 390, the outer axial communication hole 389b and the inner axial communication hole 389a of the valve accommodation inner member 380, the first radial communication holes 397 of the valve accommodation outer member 390, and the discharge passage 41 function as a first communication passage R1 (see FIG. 11).

Through the first communication passage R1, the cylinder 230 and the reservoir chamber 40 communicate with each other. The valve 317, which is mounted on the operation rod 314, the coil spring 318, and the upper-side end of the valve accommodation inner member 380 function as a first communication passage switch valve V1 (see FIG. 11). The first communication passage switch valve V1 opens and closes the first communication passage R1.

Figure 8:
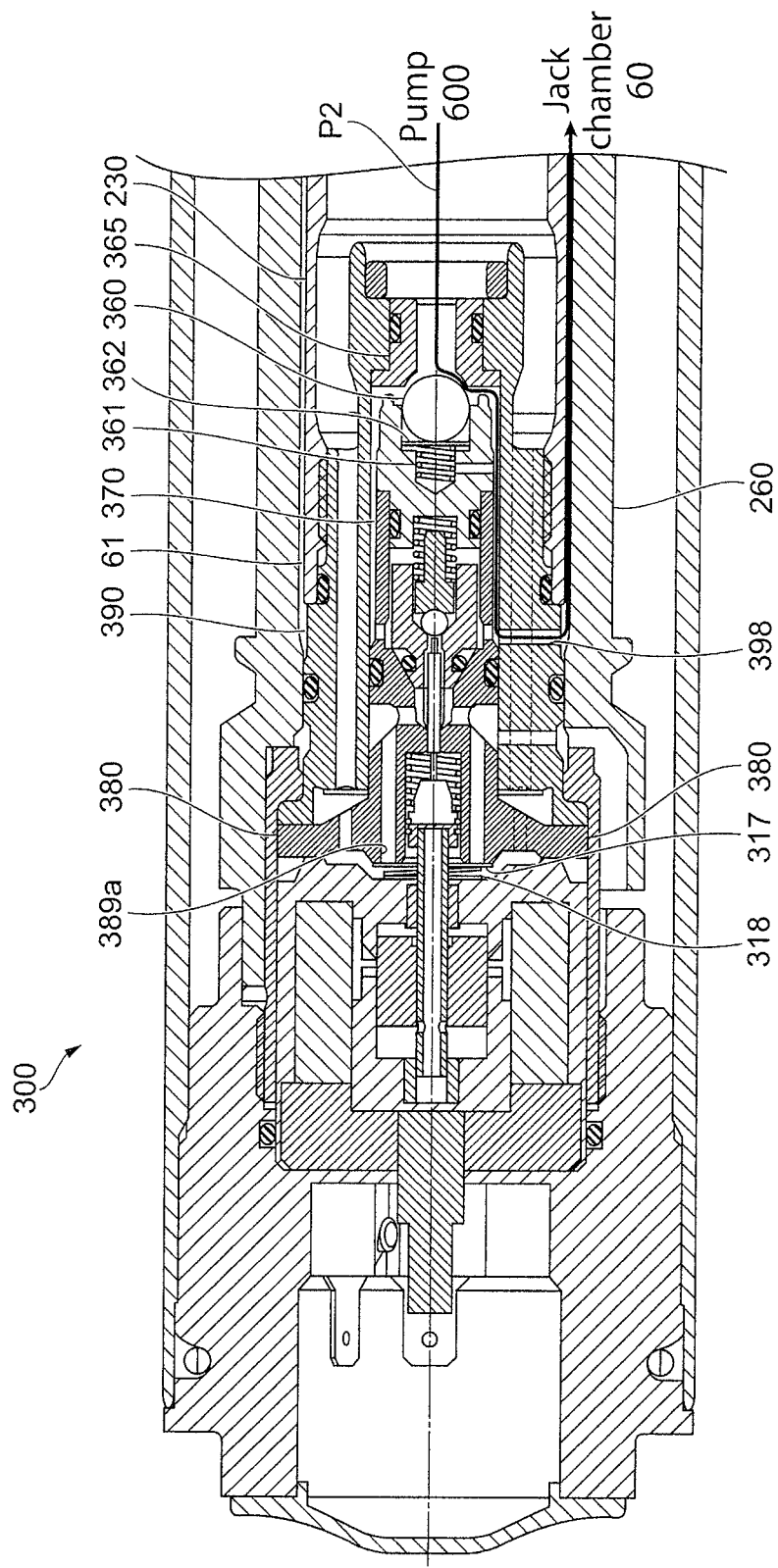
FIG. 8 illustrates a flow of oil in the passage switch unit in a second switch state.

FIG. 8 illustrates a flow of oil in the passage switch unit 300 in the second switch state.

When the passage switch unit 300 is in the second switch state at the time of the compression stroke of the front fork 21, the valve 317, which is mounted on the operation rod 314, closes the inner axial communication hole 389a, which is formed in the valve accommodation inner member 380. This causes the oil discharged from the pump 600 to flow to the jack chamber 60 as indicated by arrow P2 in FIG. 8. Specifically, the oil discharged from the pump 600 pushes up the ball 360 against the urging force of the coil spring 361, and flows in the upper side direction through the gap between the outer surface of the valve accommodation inner member 380 and the inner surface of the valve accommodation outer member 390 and the gap between the outer surface of the accommodation member 370 and the inner surface of the valve accommodation outer member 390. Then, the oil flows to the outside of the valve accommodation outer member 390 through the second radial communication holes 398 of the valve accommodation outer member 390. The oil that has passed through the second radial communication holes 398 flows to the jack chamber 60 through the ring-shaped passage 61, which is defined between the outer surface of the cylinder 230 and the inner surface of the base member 260 of the spring length adjustment unit 250.

Thus, the gap between the outer surface of the valve accommodation inner member 380 and the inner surface of the valve accommodation outer member 390, the gap between the outer surface of the accommodation member 370 and the inner surface of the valve accommodation outer member 390, the second radial communication holes 398 of the valve accommodation outer member 390, and the ring-shaped passage 61 function as a second communication passage R2 (see FIG. 11). Through the second communication passage R2, the cylinder 230 and the jack chamber 60 communicate with each other. The ball 360, the coil spring 361, the disc 362, and the ball seat member 365 function as a second communication passage switch valve V2 (see FIG. 11). The second communication passage switch valve V2 opens and closes the second communication passage R2. The second communication passage switch valve V2 also functions as a check valve that allows oil to flow from the inside of the cylinder 230 into the jack chamber 60 and that inhibits the oil from flowing from the jack chamber 60 into the cylinder 230.

Figure 9:
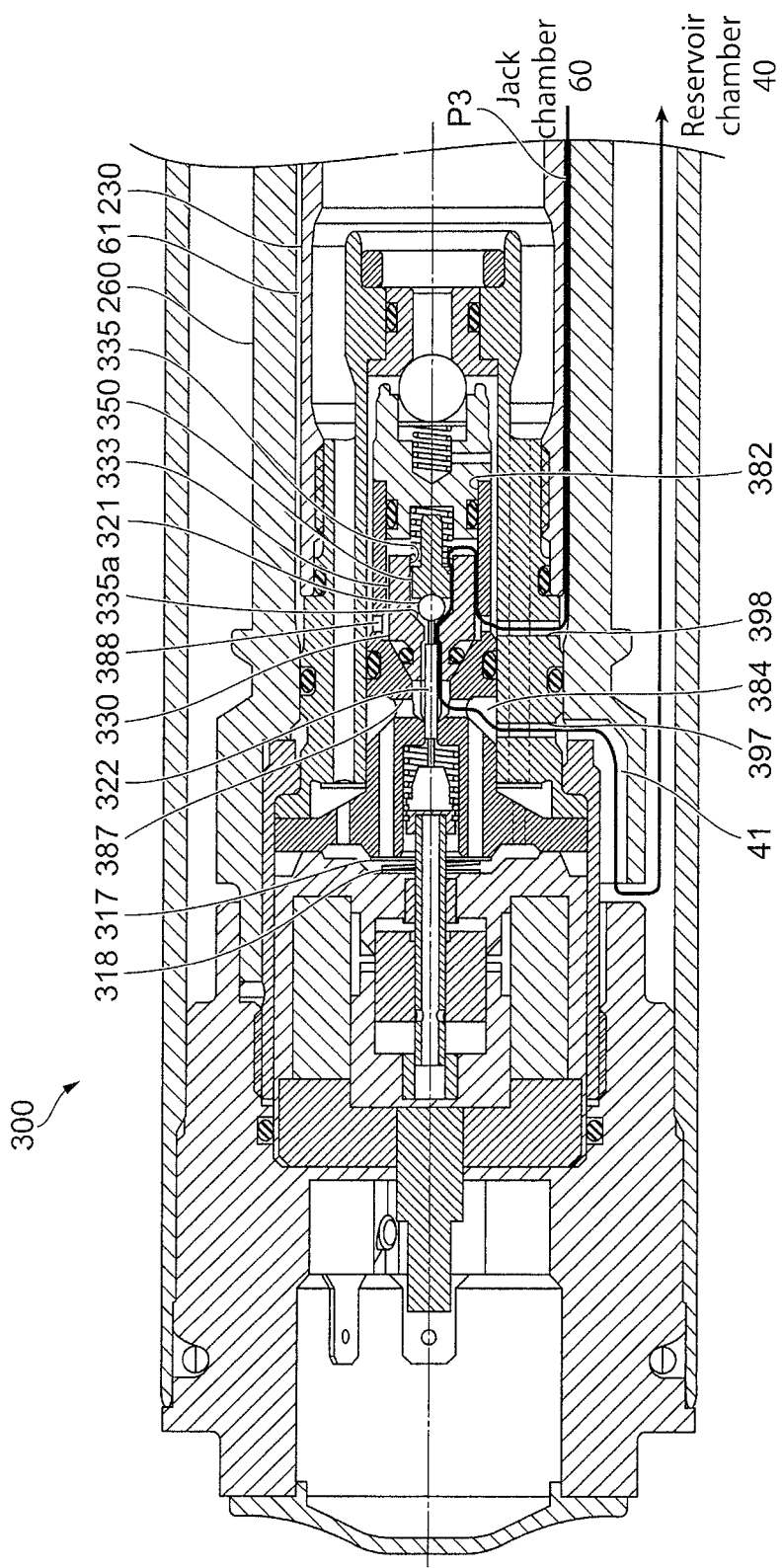
FIG. 9 illustrates a flow of oil in the passage switch unit in a third switch state.

FIG. 9 illustrates a flow of oil in the passage switch unit 300 in the third switch state.

When the passage switch unit 300 is in the third switch state at the time of the compression stroke of the front fork 21, the oil in the jack chamber 60 flows to the reservoir chamber 40 as indicated by arrow P3 in FIG. 9. Specifically, the oil in the jack chamber 60 enters the lower-end depression 382 of the valve accommodation inner member 380 through the ring-shaped passage 61, which is defined between the outer surface of the cylinder 230 and the inner surface of the base member 260 of the spring length adjustment unit 250, through the second radial communication holes 398 of the valve accommodation outer member 390, and through the second radial communication holes 388 of the valve accommodation inner member 380. The oil that has entered the lower-end depression 382 of the valve accommodation inner member 380 flows in the lower side direction through the gap between the valve accommodation inner member 380 and the outer surface of the solid cylindrical portion 333 of the valve-body seat member 330, and enters the lower-end depression 335 of the valve-body seat member 330. The oil that has entered the lower-end depression 335 of the valve-body seat member 330 flows in the upper side direction through the gap between the press member 350 and the valve body 321 and the gap between the push rod 322 and the valve-body seat member 330, and passes through the first radial communication holes 387 of the valve accommodation inner member 380. The oil that has passed through the first radial communication holes 387 of the valve accommodation inner member 380 flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the ring-shaped passage 61, the second radial communication holes 398 of the valve accommodation outer member 390, the second radial communication holes 388 of the valve accommodation inner member 380, the gap between the valve accommodation inner member 380 and the outer surface of the solid cylindrical portion 333 of the valve-body seat member 330, the gap between the press member 350, the valve body 321, and the push rod 322, and the valve-body seat member 330, the first radial communication holes 387 of the valve accommodation inner member 380, the first radial communication holes 397 of the valve accommodation outer member 390, and the discharge passage 41 function as a third communication passage R3 (see FIG. 11), which is an example of the guide passage. Through the third communication passage R3, the jack chamber 60 and the reservoir chamber 40 communicate with each other. The valve body 321 and the inclined surface 335a of the lower-end depression 335 of the valve-body seat member 330 function as a third communication passage switch valve V3 (see FIG. 11). The third communication passage switch valve V3 opens and closes the third communication passage R3.

Figure 10:
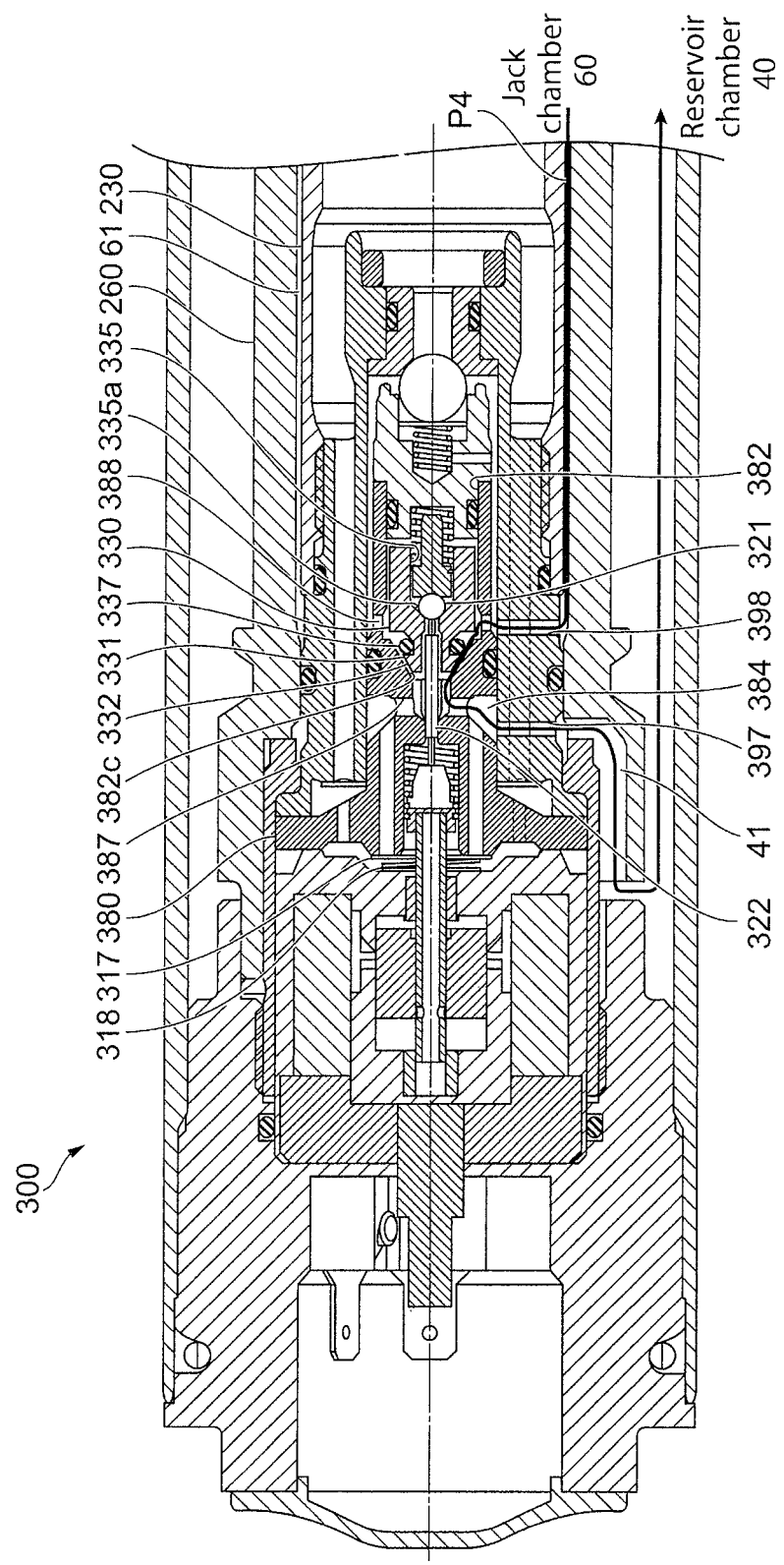
FIG. 10 illustrates a flow of oil in the passage switch unit in a fourth switch state.

FIG. 10 illustrates a flow of oil in the passage switch unit 300 in the fourth switch state.

When the passage switch unit 300 is in the fourth switch state at the time of the compression stroke of the front fork 21, the oil in the jack chamber 60 flows to the reservoir chamber 40 as indicated by arrow P4 in FIG. 10. Specifically, the oil in the jack chamber 60 enters the lower-end depression 382 of the valve accommodation inner member 380 through the ring-shaped passage 61, the second radial communication holes 398 of the valve accommodation outer member 390, the second radial communication holes 388 of the valve accommodation inner member 380. The oil that has entered the lower-end depression 382 of the valve accommodation inner member 380 flows in the upper side direction through the gap defined by the inclined surface 331 of the conical portion 332 of the valve-body seat member 330, the O ring 337, and the inclined surface on the conical depression 382c of the valve accommodation inner member 380, and passes through the first radial communication holes 387 of the valve accommodation inner member 380. The oil that has passed the first radial communication holes 387 of the valve accommodation inner member 380 flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the ring-shaped passage 61, the second radial communication holes 398 of the valve accommodation outer member 390, the second radial communication holes 388 of the valve accommodation inner member 380, the gap defined by the inclined surface 331 of the valve-body seat member 330, the O ring 337, and the inclined surface on the conical depression 382c of the valve accommodation inner member 380, the first radial communication holes 387 of the valve accommodation inner member 380, the first radial communication holes 397 of the valve accommodation outer member 390, and the discharge passage 41 function as a fourth communication passage R4 (not illustrated). Through the fourth communication passage R4, the jack chamber 60 and the reservoir chamber 40 communicate with each other. The inclined surface 331 of the conical portion 332 of the valve-body seat member 330, the O ring 337, and the inclined surface on the conical depression 382c of the valve accommodation inner member 380 function as a fourth communication passage switch valve V4 (not illustrated). The fourth communication passage switch valve V4 opens and closes the fourth communication passage R4.

Change from Third Switch State to Fourth Switch State of Passage Switch Unit 300

When the passage switch unit 300 is in the third switch state, the oil in the jack chamber 60 flows to the reservoir chamber 40 as indicated by arrow P3 illustrated in FIG. 9. This flow of the oil causes the amount of the oil in the jack chamber 60 to decrease, causing a reduction in length of the spring 500. The reduction in length of the spring 500 causes the pressure in the jack chamber 60 to decrease. As a result, the pressure in a back pressure chamber defined between the valve-body seat member 330 and the accommodation member 370 at the time when the passage switch unit 300 is in the third switch state is lower than the pressure in the back pressure chamber at the time when the passage switch unit 300 is in the second switch state. This causes the valve-body seat member 330 to start to move in the lower side direction.

When the coil 311 of the solenoid 310 is supplied a current that is equal to or higher than the third reference current, the push rod 322 moves the valve body 321 further in the lower side direction than when the passage switch unit 300 is in the third switch state. This enlarges the gap between the valve body 321 and the inclined surface 335a of the lower-end depression 335 of the valve-body seat member 330. As a result, the pressure in the jack chamber 60 further decreases, causing a further decrease in the pressure in the back pressure chamber. The further decrease in the pressure in the back pressure chamber causes the valve-body seat member 330 to move in the lower side direction. This causes the inclined surface 331 of the conical portion 332 of the valve-body seat member 330 to move away from the inclined surface on the conical depression 382c of the valve accommodation inner member 380. Thus, the third switch state changes to the fourth switch state.

Communication Passages Open or Closed in Accordance with Switch State Selected by Passage Switch Unit 300

Figure 11A:
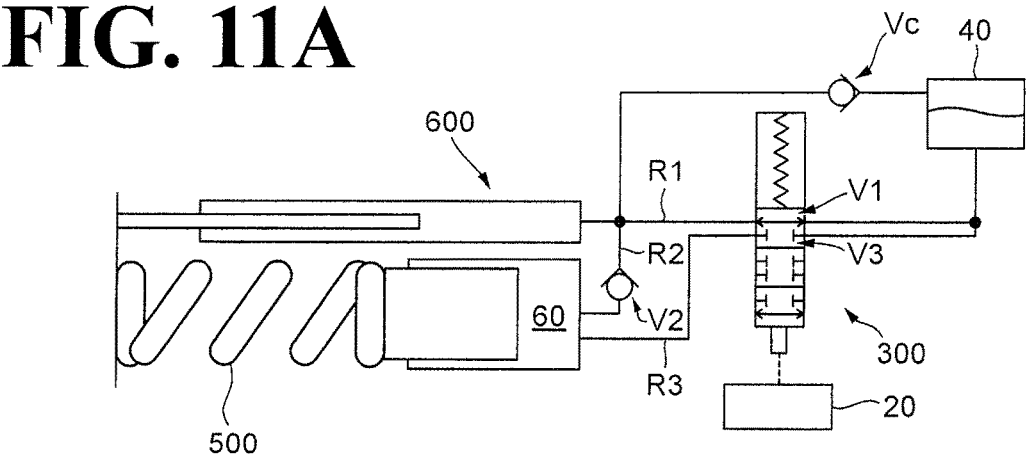
FIG. 11A illustrates whether a first communication passage, a second communication passage, and a third communication passage are open or closed when the passage switch unit is in the first switch state.
Figure 11B:
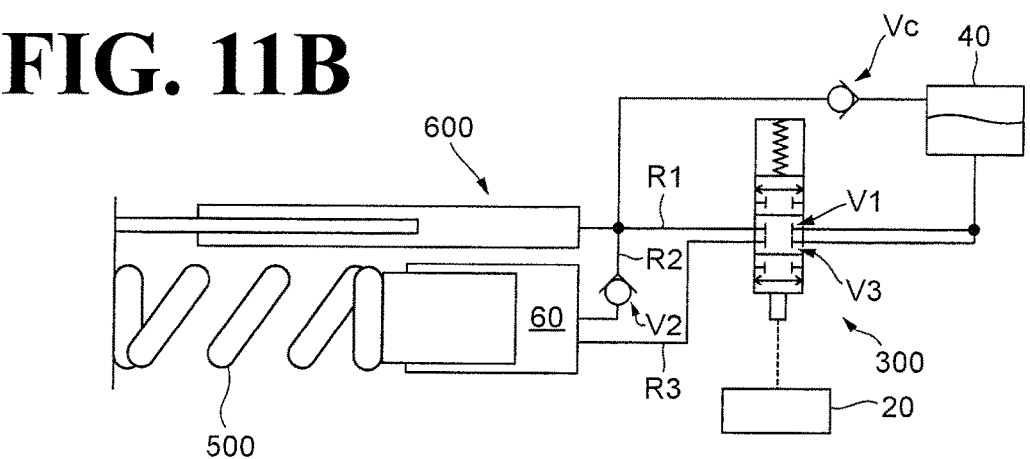
FIG. 11B illustrates whether the first communication passage, the second communication passage, and the third communication passage are open or closed when the passage switch unit is in the second switch state.
Figure 11C:
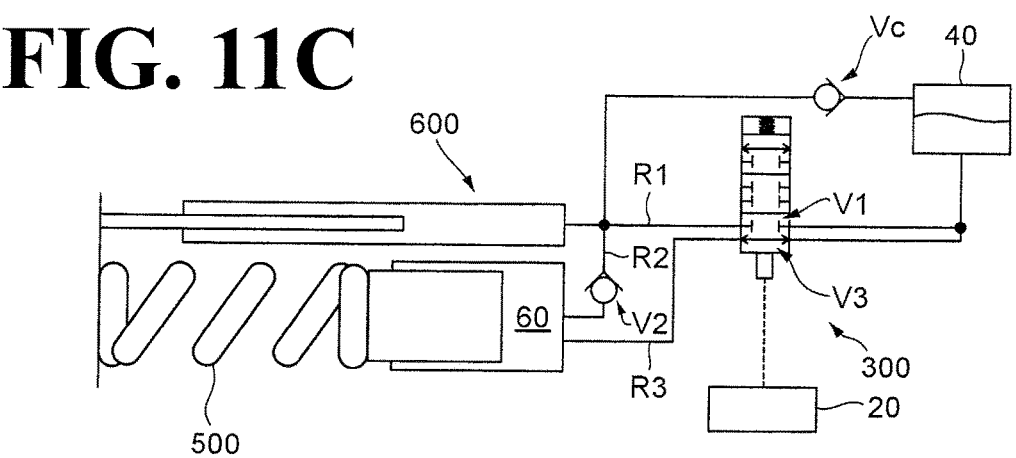
FIG. 11C illustrates whether the first communication passage, the second communication passage, and the third communication passage are open or closed when the passage switch unit is in the third switch state.

FIG. 11A illustrates whether the first communication passage R1, the second communication passage R2, and the third communication passage R3 are open or closed when the passage switch unit 300 is in the first switch state. FIG. 11B illustrates whether the first communication passage R1, the second communication passage R2, and the third communication passage R3 are open or closed when the passage switch unit 300 is in the second switch state. FIG. 11C illustrates whether the first communication passage R1, the second communication passage R2, and the third communication passage R3 are open or closed when the passage switch unit 300 is in the third switch state.

As illustrated in FIG. 11A, when the current supplied to the coil 311 of the solenoid 310 is less than the first reference current, the passage switch unit 300 is in the first switch state. That is, the first communication passage switch valve V1 is open and the third communication passage switch valve V3 is closed. This causes the oil discharged from the pump 600 to reach the reservoir chamber 40 through the first communication passage R1. In this case, the oil discharged from the pump 600 does not have such a high pressure as to open the second communication passage switch valve V2. Hence, the oil does not flow through the second communication passage R2. In other words, since the first communication passage switch valve V1 is open, the second communication passage switch valve V2 is closed. In the first switch state, the oil in the jack chamber 60 does not increase or decrease.

As illustrated in FIG. 11B, when the current supplied to the coil 311 of the solenoid 310 is equal to or higher than the first reference current and less than the second reference current, the passage switch unit 300 is in the second switch state. That is, the first communication passage switch valve V1 and the third communication passage switch valve V3 are closed. Thus, the oil discharged from the pump 600 opens the second communication passage switch valve V2 to reach the jack chamber 60 through the second communication passage R2. In the second switch state, the amount of the oil in the jack chamber 60 increases.

As illustrated in FIG. 11C, when the current supplied to the coil 311 of the solenoid 310 is equal to or higher than the second reference current and less than the third reference current, the passage switch unit 300 is in the third switch state. That is, the first communication passage switch valve V1 is closed and the third communication passage switch valve V3 is open. This causes the oil in the jack chamber 60 to reach the reservoir chamber 40 through the third communication passage R3. In the third switch state, the amount of the oil in the jack chamber 60 decreases.

When the current supplied to the coil 311 of the solenoid 310 is equal to or higher than the third reference current, the passage switch unit 300 is in the fourth switch state. That is, the first communication passage switch valve V1 is closed and the fourth communication passage switch valve V4 is open. This causes the oil in the jack chamber 60 to reach the reservoir chamber 40 through the fourth communication passage R4.

The passage defined in the fourth switch state by the gap defined by the inclined surface 331 of the conical portion 332 of the valve-body seat member 330, the O ring 337, and the inclined surface on the valve accommodation inner member 380 is wider than the passage defined in the third switch state by the gap between the valve accommodation inner member 380 and the outer surface of the solid cylindrical portion 333 of the valve-body seat member 330.

The passage defined in the third switch state by the gap between the valve body 321 and the inclined surface 335a on the valve-body seat member 330 is narrower than the passage defined in the third switch state by the gap between the valve accommodation inner member 380 and the outer surface of the solid cylindrical portion 333 of the valve-body seat member 330. Therefore, when the passage switch unit 300 is in the fourth switch state, the amount of the oil in the jack chamber 60 decreases more quickly than when the passage switch unit 300 is in the third switch state.

Up-and-Down of Vehicle Height

In the front fork 21 operating in the above-described manner, when the passage switch unit 300 is in the second switch state, the oil discharged from the pump 600 at the time of the compression stroke flows into the jack chamber 60, increasing the amount of oil in the jack chamber 60. The increase in the amount of oil in the jack chamber 60 causes the upper-side end support member 270 to move in the lower-side direction relative to the base member 260 of the spring length adjustment unit 250. The movement of the upper-side end support member 270 in the lower-side direction relative to the base member 260 causes the spring length of the spring 500 to shorten. The shortened spring length of the spring 500 causes the spring force of the spring 500 in pressing the upper-side end support member 270 to increase as compared with the spring force before the movement of the upper-side end support member 270 relative to the base member 260. This causes an increase in preset load (preload), which is an amount of load that keeps the position of the body frame 11 unchanged relative to the position of the front wheel 2 even when force acts from the body frame 11 toward the front wheel 2 side. In this case, the amount of depression of the front fork 21 is smaller when the same amount of force acts in the axial direction from the body frame 11 (seat 19) side. Thus, when the spring length of the spring 500 is shortened due to the movement of the upper-side end support member 270 relative to the base member 260, the height of the seat 19 increases as compared with the height of the seat 19 before the movement of the upper-side end support member 270 relative to the base member 260 (that is, the vehicle height increases).

When the passage switch unit 300 is in the third switch state or the fourth switch state, the amount of oil in the jack chamber 60 decreases. The decrease in the amount of oil causes the upper-side end support member 270 to move in the upper-side direction relative to the base member 260 of the spring length adjustment unit 250. The movement of the upper-side end support member 270 in the upper-side direction relative to the base member 260 causes the spring length of the spring 500 to increase. The increased spring length of the spring 500 causes the spring force of the spring 500 in pressing the upper-side end support member 270 to reduce as compared with the spring force before the movement of the upper-side end support member 270 relative to the base member 260. This causes the preset load (pre-load) to decrease, and the amount of depression of the front fork 21 is larger when the same amount of force acts in the axial direction from the body frame 11 (seat 19) side. Thus, when the spring length of the spring 500 is increased due to the movement of the upper-side end support member 270 in the upper-side direction relative to the base member 260, the height of the seat 19 decreases as compared with the height of the seat 19 before the movement of the upper-side end support member 270 relative to the base member 260 (that is, the vehicle height decreases). When the passage switch unit 300 is in the fourth switch state, the amount of the oil in the jack chamber 60 decreases more quickly than when the passage switch unit 300 is in the third switch state, as described above. Hence, when the passage switch unit 300 is in the fourth switch state, the vehicle height decreases more quickly than when the passage switch unit 300 is in the third switch state.

When the passage switch unit 300 is in the first switch state, the oil discharged from the pump 600 at the time of the compression stroke flows into the reservoir chamber 40, and thus the amount of oil in the jack chamber 60 does not increase or decrease. Thus, the height of the seat 19 is maintained (that is, the vehicle height is maintained).

As has been described hereinbefore, the front fork 21 according to this embodiment includes the spring 500 and the spring length adjustment unit 250. The spring 500 has an upper-side end supported on the side of the body 10 and a lower-side end supported on the side of the front wheel 2. The spring length adjustment unit 250 includes the jack chamber 60 (which is the accommodation chamber) to accommodate oil (which is the fluid), supports the spring 500 at its upper-side end, and adjusts the length of the spring 500 in accordance with the amount of the oil in the jack chamber 60. The front fork 21 includes the reservoir chamber 40 (which is the storage chamber) and the pump 600. The reservoir chamber 40 stores oil. The pump 600 includes the cylinder 230. When the relative distance between the body 10 and the front wheel 2 increases, the pump 600 takes the oil stored in the reservoir chamber 40 into the cylinder 230. When the relative distance between the body 10 and the front wheel 2 decreases, the pump 600 discharges the oil out of the cylinder 230. The front fork 21 includes the passage switch unit 300 including the first communication passage R1, the second communication passage R2, and the third communication passage R3. The first communication passage R1 communicates the inside of the cylinder 230 and the reservoir chamber 40 with each other. The second communication passage R2 communicates the inside of the cylinder 230 and the jack chamber 60 with each other. The third communication passage R3 communicates the jack chamber 60 and the reservoir chamber 40 with each other. In accordance with an amount of the supplied current, the passage switch unit 300 switches the oil passages. The passage switch unit 300 includes the second communication passage switch valve V2 disposed on the second communication passage R2. The second communication passage switch valve V2 allows the oil to flow from the cylinder 230 to the jack chamber 60 and disallows the oil to flow from the jack chamber 60 to the cylinder 230. In accordance with the supplied current, the passage switch unit 300 switches among a first state, a second state, and a third state. In the first state, the first communication passage R1 is open, and the third communication passage R3 is closed. In the second state, the first communication passage R1 and the third communication passage R3 are closed. In the third state, the first communication passage R1 is closed, and the third communication passage R3 is open.

When the supplied current is equal to or higher than the first reference current, the passage switch unit 300 enables the cylinder 230 and the jack chamber 60 to communicate with each other so as to guide the oil discharged from the pump 600 to the jack chamber 60, or enables the jack chamber 60 and the reservoir chamber 40 to communicate with each other so as to guide the oil accommodated in the jack chamber 60 to the reservoir chamber 40. In this manner, the vehicle height is increased and decreased. When the supply of current is unexpectedly stopped due to a malfunction such as wiring disconnection causing loss of power, the passage switch unit 300 makes the cylinder 230 communicate with the reservoir chamber 40 so as to guide the oil discharged from the pump 600 to the reservoir chamber 40. This configuration ensures that the oil discharged from the pump 600 is not guided to the jack chamber 60, and that the oil accommodated in the jack chamber 60 is not guided to the reservoir chamber 40. As a result, when the supply of current to the passage switch unit 300 is unexpectedly stopped due to a malfunction or other possible occurrences, the amount of the oil in the jack chamber 60 does not increase or decrease. Thus, the vehicle height is maintained.

With this configuration, even if such a malfunction occurs while, for example, the vehicle is traveling at a high speed with the vehicle height being increased, that the supply of current to the solenoid 310 of the passage switch unit 300 is stopped, the front fork 21 according to this embodiment maintains the vehicle height. Hence, with the front fork 21 according to this embodiment, even if the supply of current to the solenoid 310 of the passage switch unit 300 is unexpectedly stopped during travel due to a malfunction or other possible occurrences, the rider of the vehicle is able to incline the vehicle body at a bank angle similar to a bank angle that the rider could secure before the malfunction occurred.

The passage switch unit 300 according to this embodiment includes the first communication passage R1, the second communication passage R2, and the third communication passage R3. Through the first communication passage R1, the cylinder 230 and the reservoir chamber 40 communicate with each other. Through the second communication passage R2, the cylinder 230 and the jack chamber 60 communicate with each other. Through the third communication passage R3, the jack chamber 60 and the reservoir chamber 40 communicate with each other. When the supplied current is less than the predetermined first reference current, the passage switch unit 300 opens the first communication passage R1 and closes the third communication passage R3. When the supplied current is equal to or higher than the first reference current and less than the second reference current, the passage switch unit 300 closes the first communication passage R1 and the third communication passage R3. When the supplied current is equal to or higher than the second reference current, the passage switch unit 300 closes the first communication passage R1 and opens the third communication passage R3.

Thus, the passage switch unit 300 according to this embodiment opens one of the first communication passage R1, the second communication passage R2, and the third communication passage R3 in accordance with the amount of the supplied current. That is, the passage switch unit 300 increases, decreases, and maintains the vehicle height by controlling the amount of axial movement of the operation rod 314 of the solenoid 310 in accordance with the amount of the supplied current. In other words, three controls modes are controllable using the single passage switch unit 300 in accordance with the amount of the supplied current. The three control modes are a height-up mode for increasing the vehicle height, a height-down mode for decreasing the vehicle height, and a maintaining mode for maintaining the vehicle height.

In order to implement the above-described functions, the passage switch unit 300 is mounted on the upper-side end of the cylinder 230 inside of the inner tube 210. That is, the passage switch unit 300 is not disposed outside of the inner tube 210. It is not necessary for the passage switch unit 300 to have a plurality of electromagnetic actuators (such as solenoids) in implementing the three control modes. Thus, the passage switch unit 300 according to this embodiment simplifies the configuration of the front fork 21 and saves space, while at the same time implementing the above-described functions. In other words, applying the passage switch unit 300 according to this embodiment to the front fork 21 in a limited space eliminates the need for increasing the size of the front fork 21 in implementing the three control modes.

The passage switch unit 300 according to this embodiment is in the maintaining mode when the supplied current is less than the first reference current, in the height-up mode when the supplied current is equal to or higher than the first reference current and less than the second reference current, and in the height-down mode when the supplied current is equal to or higher than the second reference current. That is, the passage switch unit 300 changes its modes in the order: the maintaining mode, the height-up mode, and the height-down mode, as the amount of the supplied current increases.

The passage switch unit 300 according to this embodiment does not change its modes in the order: the maintaining mode, the height-down mode, and the height-up mode, as the amount of the supplied current increases. With the configuration of shifting in the order: the maintaining mode, the height-down mode, and the height-up mode, when the current amount is decreased to maintain the vehicle height as increased, the current amount may temporarily become an amount corresponding to the height-down mode, which may result in an unintended decrease in the vehicle height.

In view of this, the passage switch unit 300 according to this embodiment changes its modes in the order: the maintaining mode, the height-up mode, and the height-down mode, as the amount of the supplied current increases. Consequently, even if the current amount is decreased to maintain the vehicle height as increased, a decrease in the vehicle height does not occur.

Opening Easiness of Third Communication Passage Switch Valve V3

As described above, the valve body 321 and the inclined surface 335a of the valve-body seat member 330 function as the third communication passage switch valve V3 to open and close the third communication passage R3. The valve body 321 is brought into contact with the inclined surface 335a so as to close the third communication passage R3. While the third communication passage R3 is closed, the cross-sectional area Sv (see FIG. 4) of the contact portion of the valve body 321 which is in contact with the inclined surface 355a in the direction perpendicular to the axial direction is a pressure receiving area for receiving a force exerted to the valve body 321 upwardly (in a direction reverse to the direction of pressing by the push rod 322). The force exerted to the valve body 321 upwardly is spring force of the coil spring 340+pressure in the lower-end depression 335 of the valve-body seat member 330 (pressure in the jack chamber 60)×cross-sectional area Sv.

Meanwhile, the cross-sectional area Sp of the third shaft 322c of the push rod 322 in the direction perpendicular to the axial direction is a pressure receiving area for receiving a pressure in the upper-end depression 381 of the valve accommodation inner member 380 (hereinafter referred to as "push-rod back pressure"). In other words, the cross-sectional area Sp is a pressure receiving area for receiving a force exerted to the push rod 322 in such a direction that the push rod 322 presses the valve body 321 due to discharge of the oil from the pump 600.

In this embodiment, the cross-sectional area Sv of the contact portion of the valve body 321 in contact with the inclined surface 335a is set to be approximately equal to or slightly larger than the cross-sectional area Sp of the third shaft 322c of the push rod 322.

When the load on the motorcycle 1 is excessively heavier than supposed, the length of the spring 500 is decreased to increase the oil pressure in the jack chamber 60 even if the position of the upper-side end support member 270 is the same relative to the base member 260 of the spring length adjustment unit 250. This accordingly increases the pressure in the lower-end depression 335 of the valve-body seat member 330 accommodating the valve body 321, which may cause difficulty in opening the third communication passage switch valve V3. When difficulty is caused in opening the third communication passage switch valve V3, supply of a current equal to or higher than the second reference current to the coil 311 of the solenoid 310 of the passage switch unit 300 may not cause the third communication passage switch valve V3 to be open, which may hinder the vehicle height from decreasing.

In this embodiment, the through hole 317a is formed at the position in the valve 137 which faces the upper-end depression 381 of the valve accommodation inner member 380. Consequently, even when the passage switch unit 300 is in the second switch state, the push-rod back pressure pulses between a range lower than the pressure in the jack chamber 60 and a range higher than the pressure in the jack chamber 60 in accordance with expansion and contraction of the front fork 21. The cross-sectional area Sv of the valve body 321 is set to be approximately equal to or slightly larger than the cross-sectional area Sp of the push rod 322. Under this setting, even when the passage switch unit 300 is in the second switch state, the push rod 322 presses down the valve body 321 when the push-rod back pressure is higher than the pressure in the jack chamber 60. Therefore, in the process of shifting from the second switch state to the third switch state, a thrust slightly larger than the thrust of the solenoid 310 in the second switch state is generated to cause the push rod 322 to press down the valve body 321. That is, a thrust slightly larger than the thrust of the solenoid 310 in the second switch state is generated to open the third communication passage switch valve V3.

In this manner, with the configuration of this embodiment, even if the valve opening load of the third communication passage switch valve V3 is increased by an unexpected factor such as a sticking phenomenon of the valve body 321 due to overload and neglect over time, the discharge pressure from the pump 600 is utilized to facilitate opening of the third communication passage switch valve V3.

It is noted that the cross-sectional area Sv of the valve body 321 may be set to be slightly larger than the cross-sectional area Sp of the push rod 322 so as to prevent the push rod 322 from pressing down the valve body 321 when the passage switch unit 300 is in the second switch state and when the push-rod back pressure is higher than the pressure in the jack chamber 60.

Closing Easiness of Third Communication Passage Switch Valve V3

The accommodation member 370 according to this embodiment includes the axial through hole 376 extending in the axial direction to communicate the upper-end depression 371 and the lower-end depression 372 with each other.

The second solid cylindrical portion 352 of the press member 350 according to this embodiment is fitted in the axial through hole 376 formed in the accommodation member 370. The diameter of the second solid cylindrical portion 352 of the press member 350 is set to be approximately equal to or slightly smaller than the diameter of the axial through hole 376 formed in the accommodation member 370. With this configuration, the press member 350 is supported movably in the axial direction by the accommodation member 370. That is, the accommodation member 370 is disposed in the opening of the valve accommodation inner member 380 and functions as a support member to movably support the second solid cylindrical portion 352 of the press member 350. In this embodiment, the cross-sectional area Sc (see FIG. 4) of the second solid cylindrical portion 352 of the press member 350 in the direction perpendicular to the axial direction is set to be larger than the cross-sectional area Sv of the contact portion of the valve body 321 which is in contact with the inclined surface 335a.

In order to shift the passage switch unit 300 from the third switch state to the second switch state or the first switch state, the current supplied to the coil 311 of the solenoid 310 is decreased to a level less than the second reference current so as to change the protrusion amount of the operation rod 314 from the case 315 to a level less than the second reference amount. In this case, when the force exerted to the press member 350 in the direction for pressing the valve body 321 is larger than push-rod back pressure×cross-sectional area Sp of the push rod 322, the third communication passage switch valve V3 is closed.

In this embodiment, since the accommodation member 370 includes the radial through holes 375 penetrating in the radial direction to communicate the inside of the lower-end depression 372 and the outside of the accommodation member 370 with each other, the axial through hole 376 communicates with the jack chamber 60. Therefore, the lower end portion of the second solid cylindrical portion 352 of the press member 350, which is an end portion on the side opposite to the valve body 321 side, receives the pressure of the jack chamber 60. As a result, the force exerted to the press member 350 in the direction for pressing the valve body 321 is a sum of the spring force of the coil spring 340 and the pressure in the jack chamber 60×cross-sectional area Sc. That is, the force exerted to the press member 350 in the direction for pressing the valve body 321 in this embodiment is larger than in a configuration in which the lower end portion of the second solid cylindrical portion 352 of the press member 350 does not receive the pressure of the jack chamber 60 or than in a configuration in which the lower end portion of the second solid cylindrical portion 352 receives a pressure (such as a pressure in the lower-end depression 335 of the valve-body seat member 330) lower than the pressure of the jack chamber 60. As a result, with the configuration of this embodiment, the third communication passage switch valve V3 can be closed more quickly than without the configuration of this embodiment.

As described above, the through hole 317a is formed at the position in the valve 317 which faces the upper-end depression 381 of the valve accommodation inner member 380. Consequently, even when the passage switch unit 300 is in the third switch state and the fourth switch state, the push-rod back pressure pulses between a range lower than the pressure in the jack chamber 60 and a range higher than the pressure in the jack chamber 60 in accordance with expansion and contraction of the front fork 21.

In this embodiment, the cross-sectional area Sc of the second solid cylindrical portion 352 of the press member 350 is set to be larger than the cross-sectional area Sv of the valve body 321 (cross-sectional area Sc>cross-sectional area Sv). That is, as described above, since the cross-sectional area Sv of the valve body 321 is set to be approximately equal to or slightly larger than the cross-sectional area Sp of the third shaft 322c of the push rod 322, the cross-sectional area Sc of the second solid cylindrical portion 352 of the press member 350 is larger than the cross-sectional area Sp of the third shaft 322c of the push rod 322 (cross-sectional area Sc>cross-sectional area Sp). Therefore, with the configuration of this embodiment, the force exerted to the press member 350 in the direction for pressing the valve body 321 is larger than with the configuration in which the cross-sectional area Sc of the press member 350 is equal to or smaller than the cross-sectional area Sv of the valve body 321. This causes the third communication passage switch valve V3 to be closed more quickly. Consequently, as described above, the configuration of this embodiment facilitates quick opening of the third communication passage switch valve V3 in shifting from the first switch state or the second switch state to the third switch state and also facilitates quick closing of the third communication passage switch valve V3 in shifting from the third switch state to the first switch state or the second switch state.

In order to shift the passage switch unit 300 from the fourth switch state to the first switch state or the second switch state, the current supplied to the coil 311 of the solenoid 310 is decreased to a level less than the second reference current so as to change the protrusion amount of the operation rod 314 from the case 315 to a level less than the second reference amount. In this case, the configuration of this embodiment also ensures quicker closing of the fourth communication passage switch valve V4.

The valve-body seat member 330 is pressed and moved upwardly by the valve body 321 pressed by the press member 350 so as to close the fourth communication passage switch valve V4. The force exerted on the press member 350 of this embodiment in the direction for pressing the valve body 321 (valve-body seat member 330) is larger than in the configuration in which the lower end portion of the second solid cylindrical portion 352 of the press member 350 does not receive the pressure of the jack chamber 60 or than in the configuration in which the lower end portion of the second solid cylindrical portion 352 receives a pressure smaller than the pressure of the jack chamber 60. Consequently, the configuration of this embodiment makes it possible to close the fourth communication passage switch valve V4 more quickly than when the configuration of this embodiment is not adopted. Therefore, the configuration of this embodiment facilitates quicker closing of the fourth communication passage switch valve V4 in shifting from the fourth switch state to the first switch state or the second switch state.

As has been described heretofore, the configuration of this embodiment ensures quicker opening and closing of the third communication passage switch valve V3 in shifting from the first switch state or the second switch state to the third switch state or from the third switch state or the fourth switch state to the second switch state or the first switch state. This enhances responsiveness of opening and closing of the third communication passage switch valve V3 to operation of the solenoid 310 so as to quickly adjust the vehicle height.

Modification of Passage Switch Unit 300

In the solenoid 310 according to the above-described embodiment, such a thrust in the axial direction is generated on the plunger 313 that as the current supplied to the coil 311 is increased, the protrusion amount of the operation rod 314 from the case 315 is increased. This, however, should not be construed in a limiting sense. For example, in the solenoid 310, such a thrust in the axial direction may be generated on the plunger 313 that as the current supplied to the coil 311 is increased, the protrusion amount of the operation rod 314 from the case 315 is decreased. The passage switch unit 300 of this configuration as a single unit also controls, in accordance with the amount of the supplied current, the three control modes, namely, the height-up mode for increasing the vehicle height, the height-down mode for decreasing the vehicle height, and the maintaining mode for maintaining the vehicle height.

In the above-described embodiment, the passage switch unit 300 is switchable among the three control modes, namely, the height-up mode, the height-down mode, and the maintaining mode, and this passage switch unit 300 is applied to the front fork 21. This configuration, however, should not be construed in a limiting sense. Another possible embodiment is that the passage switch unit 300 according to the above-described embodiment is applied to the rear suspension 22.

In a non-limiting embodiment, a pressure receiving area of the shaft of the press member that receives a pressure of the accommodation chamber may be larger than a pressure receiving area of the valve body that receives a pressing force from the press member while the valve body is in contact with the seat.

In a non-limiting embodiment, the vehicle height adjustment device may further include a pump configured to take in the fluid stored in the storage chamber when a relative distance between the body and the wheel increases, and configured to discharge the fluid when the relative distance between the body and the wheel decreases. The push rod may be moved toward the valve body when receiving a pressure of the fluid discharged from the pump.

In a non-limiting embodiment, the vehicle height adjustment device may further include a check valve disposed on an accommodation-chamber guide passage configured to guide the fluid discharged from the pump to the accommodation chamber. The check valve is configured to allow the fluid to flow from the pump to the accommodation chamber and disallows the fluid to flow from the accommodation chamber to the pump. The actuator may include a valve disposed on the operation rod and be configured to close a storage-chamber guide passage configured to guide the fluid discharged from the pump to the storage chamber when a protrusion amount of the operation rod from the case is equal to or larger than a predetermined first reference amount. The valve is configured to open the guide passage when the protrusion amount of the operation rod from the case is less than the first reference amount. The push rod may be configured to be pressed by the operation rod and press the valve body to detach the valve body from the seat when the protrusion amount of the operation rod from the case is equal to or larger than a predetermined second reference amount, which is set to be larger than the first reference amount.

In a non-limiting embodiment, the protrusion amount of the operation rod of the actuator from the case may be increased as an amount of current supplied to the actuator is increased.

In a non-limiting embodiment, a thrust of the operation rod of the actuator from the case may be increased as an amount of current supplied to the actuator is increased.

The embodiments enhance responsiveness of the valve body, which operates by driving the actuator, so as to quickly adjust the vehicle height.

Obviously, numerous modifications and variations of the present invention are possible in light of the above teachings. It is therefore to be understood that within the scope of the appended claims, the present invention may be practiced otherwise than as specifically described herein.

What is claimed is:
1. A vehicle height adjustment device comprising:
   a spring comprising one end supported on a side of a body of a vehicle and comprising another end supported on a side of a wheel of the vehicle;
   an adjustor comprising an accommodation chamber that accommodates a fluid and configured to adjust a length of the spring in accordance with an amount of the fluid in the accommodation chamber;

a storage chamber storing the fluid;
a guide passage configured to guide the fluid from the accommodation chamber to the storage chamber;
an actuator comprising an operation rod protruding from a case;
a push rod configured to move when an upper end of the push rod is pressed by the operation rod of the actuator as a result of the operation rod protruding a predetermined distance from the case resulting in the push rod being pushed;
a valve body configured to close the guide passage when seated on a seat and configured to open the guide passage when pressed and detached from the seat by the push rod, which has been pressed and moved by the operation rod;
a press member comprising: a contact portion in contact with the valve body; and a rod-shaped shaft on a side of the contact portion which is opposite to the valve body side, the press member being configured to press and seat the valve body on the seat;
an accommodation member accommodating the valve body and the contact portion of the press member and comprising an opening on a side of the shaft of the press member; and
a support member disposed in the opening of the accommodation member and configured to support the shaft of the press member movably, the support member comprising a bearing hole communicating with the accommodation chamber, wherein
a side of the accommodation member where the opening is disposed is a lower side, and
the upper end of the push rod axially faces a lower end of the operation rod.

2. The vehicle height adjustment device according to claim 1, wherein
a cross-sectional area of the shaft perpendicular to an axial direction of the shaft is larger than a cross-sectional area perpendicular to the axial direction of a part of the valve body which is in contact with the contact portion.

3. The vehicle height adjustment device according to claim 2, further comprising:
a valve configured to open and close a passage formed in the accommodation member is provided at a portion of the operation rod which protrudes from the case; and
a pump configured to take in the fluid stored in the storage chamber when a relative distance between the body and the wheel increases, and configured to discharge the fluid when the relative distance between the body and the wheel decreases,
wherein the accommodation member includes an upper-end depression into which a lower end of the operation rod is inserted, said depression being formed on an upper end surface of the accommodation member and extending in an axial direction of the shaft,
the valve includes an axial through hole configured to be formed at a position facing the upper end depression, and
the push rod is moved toward the valve body when being pushed by the operation rod and also when receiving a pressure of the fluid discharged from the pump.

4. The vehicle height adjustment device according to claim 3, further comprising a check valve disposed on an accommodation-chamber guide passage configured to guide the fluid discharged from the pump to the accommodation chamber, the check valve being configured to allow the fluid to flow from the pump to the accommodation chamber and disallows the fluid to flow from the accommodation chamber to the pump,
wherein the actuator comprises a valve disposed on the operation rod and is configured to close a storage-chamber guide passage configured to guide the fluid discharged from the pump to the storage chamber when a protrusion amount of the operation rod from the case is equal to or larger than a predetermined first reference amount, the valve being configured to open the guide passage when the protrusion amount of the operation rod from the case is less than the first reference amount, and
wherein the push rod is configured to be pressed by the operation rod and press the valve body to detach the valve body from the seat when the protrusion amount of the operation rod from the case is equal to or larger than a predetermined second reference amount, which is set to be larger than the first reference amount.

5. The vehicle height adjustment device according to claim 4, wherein the protrusion amount of the operation rod of the actuator from the case is increased as an amount of current supplied to the actuator is increased.

6. The vehicle height adjustment device according to claim 4, wherein a thrust of the operation rod of the actuator from the case is increased as an amount of current supplied to the actuator is increased.

7. The vehicle height adjustment device according to claim 1, further comprising:
a valve configured to open and close a passage formed in the accommodation member is provided at a portion of the operation rod which protrudes from the case; and
a pump configured to take in the fluid stored in the storage chamber when a relative distance between the body and the wheel increases, and configured to discharge the fluid when the relative distance between the body and the wheel decreases,
wherein the accommodation member includes a depression into which a lower end of the operation rod is inserted, said depression being formed on an upper end surface of the accommodation member and extending in an axial direction of the shaft,
the valve includes an axial through hole configured to be formed at a position facing the depression, and
the push rod is moved toward the valve body when being pushed by the operation rod and also when receiving a pressure of the fluid discharged from the pump.

8. The vehicle height adjustment device according to claim 7, further comprising a check valve disposed on an accommodation-chamber guide passage configured to guide the fluid discharged from the pump to the accommodation chamber, the check valve being configured to allow the fluid to flow from the pump to the accommodation chamber and disallows the fluid to flow from the accommodation chamber to the pump,
wherein the actuator comprises a valve disposed on the operation rod and is configured to close a storage-chamber guide passage configured to guide the fluid discharged from the pump to the storage chamber when a protrusion amount of the operation rod from the case is equal to or larger than a predetermined first reference amount, the valve being configured to open the guide passage when the protrusion amount of the operation rod from the case is less than the first reference amount, and
wherein the push rod is configured to be pressed by the operation rod and press the valve body to detach the valve body from the seat when the protrusion amount of the operation rod from the case is equal to or larger than a predetermined second reference amount, which is set to be larger than the first reference amount.

9. The vehicle height adjustment device according to claim 8, wherein the protrusion amount of the operation rod of the actuator from the case is increased as an amount of current supplied to the actuator is increased.

10. The vehicle height adjustment device according to claim 8, wherein a thrust of the operation rod of the actuator from the case is increased as an amount of current supplied to the actuator is increased.

11. The vehicle height adjustment device according to claim 1, wherein the accommodation member includes a lower-end depression, which is formed on a lower end surface of the accommodation member and extending in an axial direction of the shaft, and the push rod moves when pressed by the operation of the actuator when a protrusion amount of the operation rod from the case is equal to or larger than a predetermined amount and wherein the bearing hole is configured to penetrate the support member in a radial direction so as to communicate between the accommodation chamber and the lower-end depression.

12. The vehicle height adjustment device according to claim 11, further comprising:

a valve configured to open and close a passage formed in the accommodation member is provided at a portion of the operation rod which protrudes from the case; and a pump configured to take in the fluid stored in the storage chamber when a relative distance between the body and the wheel increases, and configured to discharge the fluid when the relative distance between the body and the wheel decreases, wherein the accommodation member includes an upper-end depression into which a lower end of the operation rod is inserted, said depression being formed on an upper end surface of the accommodation member and extending in an axial direction of the shaft, the push rod is moved toward the valve body when being pushed by the operation rod and also when receiving a pressure of the fluid discharged from the pump, the push rod includes a first shaft disposed on an upper end side of the push rod, a second shaft disposed on a lower end side of the push rod, and a third shaft disposed between the first and second shafts, and a cross-sectional area perpendicular to the axial direction of a part of the valve body which is in contact with the contact portion is larger than a cross-sectional area of the third shaft perpendicular to the axial direction.

13. The vehicle height adjustment device according to claim 1, further comprising a transmission member sandwiched between the operation rod and the push rod.

* * * * *